US012806653B2

(12) United States Patent
Shang et al.

(10) Patent No.: US 12,806,653 B2
(45) Date of Patent: Nov. 24, 2026

(54) SYSTEM AND METHOD FOR AUTOMATED ARTIFICIAL VISION GUIDED DISPENSING VISCOUS FLUIDS FOR CAULKING AND SEALING OPERATIONS

(71) Applicant: MACDONALD, DETTWILER AND ASSOCIATES INC., Brampton (CA)

(72) Inventors: Limin Shang, Maple (CA); Adam Neil Philip, Etobicoke (CA); Piotr Jasiobedzki, Mississauga (CA); Mark Patrick Barnet, Toronto (CA); Timothy Reedman, Georgetown (CA)

(73) Assignee: MACDONALD, DETTWILER AND ASSOCIATES INC., Brampton (CA)

( * ) Notice: Subject to any disclaimer, the term of this patent is extended or adjusted under 35 U.S.C. 154(b) by 733 days.

(21) Appl. No.: 17/487,989

(22) Filed: Sep. 28, 2021

(65) Prior Publication Data

US 2022/0080454 A1 Mar. 17, 2022

Related U.S. Application Data

(62) Division of application No. 15/645,929, filed on Jul. 10, 2017, now Pat. No. 11,192,137.
(Continued)

(51) Int. Cl.
*B05D 1/26* (2006.01)
*B05C 1/02* (2006.01)
(Continued)

(52) U.S. Cl.
CPC ................ *B05D 1/26* (2013.01); *B05C 1/027* (2013.01); *B05C 11/1005* (2013.01);
(Continued)

(58) Field of Classification Search
CPC ................ B05C 1/027; B05C 11/1005; B05C 11/1036; B05C 5/0216; B05D 1/26;
(Continued)

(56) References Cited

U.S. PATENT DOCUMENTS 3,508,523 A 4/1970 Meerleer
4,561,139 A 12/1985 Becka et al.
(Continued)

FOREIGN PATENT DOCUMENTS

BR 102014019866 B2 5/2016
CN 1499251 A 5/2004
(Continued)

OTHER PUBLICATIONS

Chandraker, R et al., "Knowledge based control of adhesive dispensing for surface mount device assembly", Proceedings, Seventh IEEE/CHMT International Electronic Manufacturing Technology Symposium, pp. 267-272, Jan. 1, 1989.
(Continued)

*Primary Examiner* — George R Koch
(74) *Attorney, Agent, or Firm* — HILL & SCHUMACHER

(57) ABSTRACT

The present disclosure provides a method and system by which a precise amount of a viscous fluid sealing compound can be dispensed at required locations through computer vision-based observation of the fluid deposited, its rate and amount of deposition and location; and that the dispensed fluid may be accurately shaped through robotic or other special purpose mechanism motion. The invention enables instant quality inspection of the dispensing process in terms of the locations, amounts and shapes of newly created seals.

16 Claims, 23 Drawing Sheets

Related U.S. Application Data

(60) Provisional application No. 62/360,056, filed on Jul. 8, 2016.

(51) Int. Cl.

| | |
|---|---|
| ***B05C 5/02*** | (2006.01) |
| ***B05C 11/10*** | (2006.01) |
| ***B25J 5/00*** | (2006.01) |
| ***B25J 5/04*** | (2006.01) |
| ***B25J 9/16*** | (2006.01) |
| ***B25J 11/00*** | (2006.01) |
| ***B25J 15/00*** | (2006.01) |
| ***B25J 19/02*** | (2006.01) |
| ***H04N 13/204*** | (2018.01) |
| ***H04N 23/51*** | (2023.01) |
| ***H04N 23/54*** | (2023.01) |

(52) U.S. Cl.

CPC ................ *B25J 5/007* (2013.01); *B25J 5/04* (2013.01); *B25J 9/1664* (2013.01); *B25J 9/1684* (2013.01); *B25J 9/1697* (2013.01); *B25J 11/0075* (2013.01); *B25J 15/0019* (2013.01); *B25J 15/0066* (2013.01); *B25J 19/023* (2013.01); *H04N 13/204* (2018.05); *H04N 23/51* (2023.01); *H04N 23/54* (2023.01); *B05C 5/0216* (2013.01); *B05C 11/1036* (2013.01); *G05B 2219/45065* (2013.01)

(58) Field of Classification Search

CPC ................ B25J 11/0075; B25J 15/0019; B25J 15/0066; B25J 19/023; B25J 5/007; B25J 5/04; B25J 9/1664; B25J 9/1684; B25J 9/1697; G05B 2219/40298; G05B 2219/45065; H04N 13/204; H04N 23/51; H04N 23/54

USPC ............ 156/60, 91, 92, 242, 244.11, 244.12, 156/244.15, 278, 305, 349, 350, 356, 357, 156/367, 390, 500; 118/323, 712, 713, 118/300, 668, 669, 676, 679, 680; 427/8, 427/9, 10, 256, 427.2, 427.3; 222/1, 14, 222/52, 420; 901/41, 43

See application file for complete search history.

(56) References Cited

U.S. PATENT DOCUMENTS

| | | | | |
|---|---|---|---|---|
| 4,724,302 | A | | 2/1988 | Penney et al. |
| 4,904,331 | A | | 2/1990 | Martin |
| 4,935,261 | A | | 6/1990 | Srivastava et al. |
| 5,042,688 | A | | 8/1991 | Srivastava et al. |
| 5,359,542 | A | | 10/1994 | Pahmeier et al. |
| 5,681,757 | A | | 10/1997 | Hayes |
| 5,867,390 | A | | 2/1999 | Kinoh et al. |
| 6,001,181 | A | | 12/1999 | Bullen |
| 6,251,186 | B1 | | 6/2001 | Vaccani |
| 6,908,642 | B2 | | 6/2005 | Hubert |
| 8,651,046 | B1 | * | 2/2014 | Davancens ........... B05C 5/0212 901/41 |
| 9,095,872 | B2 | | 8/2015 | Topf et al. |
| 2001/0020508 | A1 | | 9/2001 | Moril et al. |
| 2002/0113198 | A1 | | 8/2002 | Bieman et al. |
| 2002/0142102 | A1 | | 10/2002 | Romine |
| 2004/0005411 | A1 | * | 1/2004 | Hubert ................ B05C 11/1018 427/256 |
| 2004/0011284 | A1 | * | 1/2004 | Schucker ............... B25J 9/1697 118/688 |
| 2004/0090590 | A1 | | 5/2004 | Geum |
| 2004/0131758 | A1 | | 7/2004 | Jung et al. |
| 2004/0168306 | A1 | | 9/2004 | Kamiyama et al. |
| 2005/0235913 | A1 | | 10/2005 | Prentice et al. |
| 2006/0254511 | A1 | | 11/2006 | Puffe |
| 2007/0236565 | A1 | * | 10/2007 | Tropf .................. B23K 9/0956 348/86 |
| 2007/0292629 | A1 | | 12/2007 | Linnenkohl et al. |
| 2008/0024602 | A1 | | 1/2008 | Linnenkohl et al. |
| 2009/0107612 | A1 | | 4/2009 | Gruber |
| 2010/0291310 | A1 | | 11/2010 | Hartmann et al. |
| 2011/0061594 | A1 | | 3/2011 | Ando et al. |
| 2015/0086706 | A1 | | 3/2015 | Guzowski |
| 2015/0093498 | A1 | | 4/2015 | Reid et al. |
| 2015/0108685 | A1 | * | 4/2015 | Pajel ..................... B29C 70/681 425/117 |
| 2015/0241870 | A1 | | 8/2015 | Toh |
| 2015/0273692 | A1 | | 10/2015 | Ogawara |
| 2015/0314890 | A1 | | 11/2015 | Desjardien et al. |
| 2015/0343487 | A1 | * | 12/2015 | Davancens ............... B05C 1/02 118/695 |
| 2016/0031030 | A1 | * | 2/2016 | Bergström ........... H05K 3/3489 118/697 |
| 2016/0279863 | A1 | * | 9/2016 | Trend ........................ B64F 5/00 |
| 2016/0325489 | A1 | * | 11/2016 | Guirguis ............... B05C 11/023 |
| 2018/0283015 | A1 | | 10/2018 | Telleria et al. |
| 2018/0339307 | A1 | | 11/2018 | Grismer et al. |
| 2018/0361464 | A1 | | 12/2018 | Hirano et al. |
| 2019/0001497 | A1 | | 1/2019 | Lelliott et al. |
| 2019/0093373 | A1 | | 3/2019 | Telleria et al. |
| 2019/0329423 | A1 | | 10/2019 | Shimodaira |

FOREIGN PATENT DOCUMENTS

| | | | |
|---|---|---|---|
| CN | 1861269 | A | 11/2006 |
| EP | 2956245 | B1 | 8/2019 |
| JP | 2015226900 | A | 12/2015 |
| KR | 20150024015 | A | 3/2015 |
| KR | 101666798 | B1 | 10/2016 |

OTHER PUBLICATIONS

Hamburgen, W.R., "Precise robotic paste dot dispensing", Proceedings., 39th Electronic Components Conference, pp. 593-602, Jan. 1, 1989.

* cited by examiner

SYSTEM AND METHOD FOR AUTOMATED ARTIFICIAL VISION GUIDED DISPENSING VISCOUS FLUIDS FOR CAULKING AND SEALING OPERATIONS

CROSS-REFERENCE TO RELATED APPLICATIONS

This application is a Divisional application of Parent application Ser. No. 15/645,929, filed on Jul. 10, 2017, which parent application is incorporated herein by reference in its entirety.

FIELD

This disclosure relates to a method and system for the automated artificial vision-guided dispensing of viscous fluids for performing caulking and sealing operations for sealing around various features such as fasteners or along joints.

BACKGROUND

Large manufactured objects fastened from multiple parts must be frequently fully sealed, for example aircraft wing's interior is used to hold fuel and sealing prevents leakage. In order to accomplish this task the head of each fastener is covered with sealing compound, which is applied as a viscous fluid that hardens. Similarly, seams between parts must also have sealing compound applied at the joins to prevent fuel seepage (so-called fillet seals). The application of such viscous sealing fluid must be done in a precise manner for several reasons including ensuring that a sufficient amount of sealant has been deposited around and/or along a sealed feature to create a reliable seal and to control the shape of the resulting seal to prevent contamination of the contained liquid or providing spaces on the hardened sealing compound in which contaminants can be build up. Furthermore the seal must be sufficiently homogeneous and cohesive that fragments of the dried sealant material do not detach from the seal after deposition. Currently, most aircraft wing sealing is performed manually as this is a complex task that cannot be easily replaced with robots. Several robotic prototypes have been developed and patents awarded.

U.S. Pat. No. 6,908,642 issued to Hubert discloses a gantry mounted robot equipped with an applicator that can seal spars of a wing section mounted on a rotary positioner. The robot's trajectory is pre-programmed and stored in a controller and can have its path adjusted by comparing images from a camera with images stored in the controller.

U.S. Pat. No. 8,651,046 issued to Davanaces discloses an apparatus for dispensing sealant that incorporates a clamp for stopping sealant flow.

U.S. Pat. No. 9,095,872 issued to Topf discloses an apparatus for dispensing sealant equipped with a variety of sensors for sensing for example temperature and pressure and includes a controller that controls movement of sealant from a storage unit to a dispensing device.

United States Patent Publication No. 2015/0086706 A1 by Guzowski discloses a sealing system with two robots, the first robot is tasked for performing the sealing and the second robot is tasked with resupplying the first robot with fresh sealant cartridges from storage.

United States Patent Publication No. US2015/0314890 discloses method and apparatus for performing an operation on a work surface of a structure and includes a motion platform and an overhead support system with the motion platform being configured to be positioned above the work surface of the structure to perform desired operations on the surface.

SUMMARY

The present disclosure provides a system and method by which a precise amount of a viscous fluid sealing compound can be dispensed at required locations through computer vision-based observation of the fluid deposited, its rate and amount of deposition and location; and that the dispensed fluid may be accurately shaped through robotic or other special purpose mechanism motion. The present system and method enables instant or real-time quality inspection of the dispensing process in terms of the locations, amounts dispensed and shapes of newly created seals.

In an embodiment there is provided a real-time computer implemented method for automated sealing one or more features located in a part, comprising:

acquiring real-time visual images of one or more features to be sealed;

detecting at least one feature associated with a part to be sealed;

computing a position and orientation of the at least one feature relative to a dispensing tip of a dispensing nozzle forming part of a sealant dispensing device and determining what position and orientation that said dispensing tip of said dispensing nozzle needs to be positioned in with respect to said at least one feature being sealed prior to dispensing sealant, said dispensing device being mounted to a robotic arm;

moving the robotic arm to position the dispensing device in the determined position and orientation with respect to the at least one feature; and real-time measuring and controlling of an amount of the sealant exiting said dispensing tip prior to the sealant being completely deposited on said part based on real-time processing of the visual images of the sealant being dispensed which are acquired during dispensing of the sealant to produce a seal.

The present disclosure provides a vision guided dispensing system for sealing one or more features located in a part, comprising:

a housing having a dispensing device mounted to said housing, said dispensing device having a dispensing nozzle;

a vision sensor mounted on said housing; and a vision processor interfaced with said dispensing device and said vision sensor, said vision processor being programmed with instructions for real-time processing of images of the one or more features being sealed and said dispensing nozzle and to determine what position and orientation that a dispensing tip of said dispensing nozzle needs to be positioned in with respect to each feature being sealed prior to dispensing sealant, said vision processor being programmed to acquire images of said dispensing tip of said dispensing nozzle while a sealant is being dispensed by said dispensing device, said vision processor being programmed with instructions for controlling an amount of sealant being dispensed and when to cease dispensing based on real-time processing of the visual images of the sealant being dispensed which are acquired during dispensing of the sealant to produce a seal.

The quality of the seal may be assessed by acquiring and analyzing images before and after the seal is applied, and determining whether the seal is placed at a preferred location with respect to the feature and has a desired shape and size.

The vision sensor may include one or more 2D cameras.

Alternatively, the vision sensor may include one or more 2D camera and one or more rangefinders.

The vision sensor may be mounted to observe a tip of the dispenser nozzle, feature being sealed or both of them and a surface of the part close to the nozzle which is being sealed.

The vision sensor may include one or more stereo cameras.

The vision sensor may include one or more 3D cameras.

The vision sensor may include one or more 2D cameras and one or more structured light projectors.

The present disclosure also provides a sealing system for automated artificial vision-guided dispensing of viscous fluids for caulking and sealing operations around various features on a part, comprising:

- a mobile platform for gross positioning of said system relative to said part containing said features;
- a dispensing device for applying sealant to said feature;
- a positioning device mounted on said mobile platform to which said dispensing device is attached for positioning the dispensing device relative to said feature;
- a sensing device for determining the position of the mobile platform relative to said part;
- a second sensing device for determining the position of said feature on said part with respect to the dispensing device and also determining the required amount of sealant to be dispensed based on visual images of the sealant being dispensed; and
- a controller for controlling said positioning device and said dispensing device based on feedback from said second sensing device.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Fasteners are often sealed by creating a dome shaped deposition of the sealing compound. This is typical for rivets, as for such low profile fasteners, the dome shape provides the minimum amount of compound, while ensuring required thickness. Other fasteners, such as hi-loks and bolts, are taller and a truncated conical shape or cone provides the minimum amount of sealant, while ensuring required thickness. In the description below the term dome sealing should be understood to include other shapes of deposited sealing compound including conical.

While the present computer controlled sealing method and system is illustrated and described below with specific reference to aircraft wings, it will be appreciated that the system and method disclosed herein may be used for other manufacturing endevours.

Figure 1:
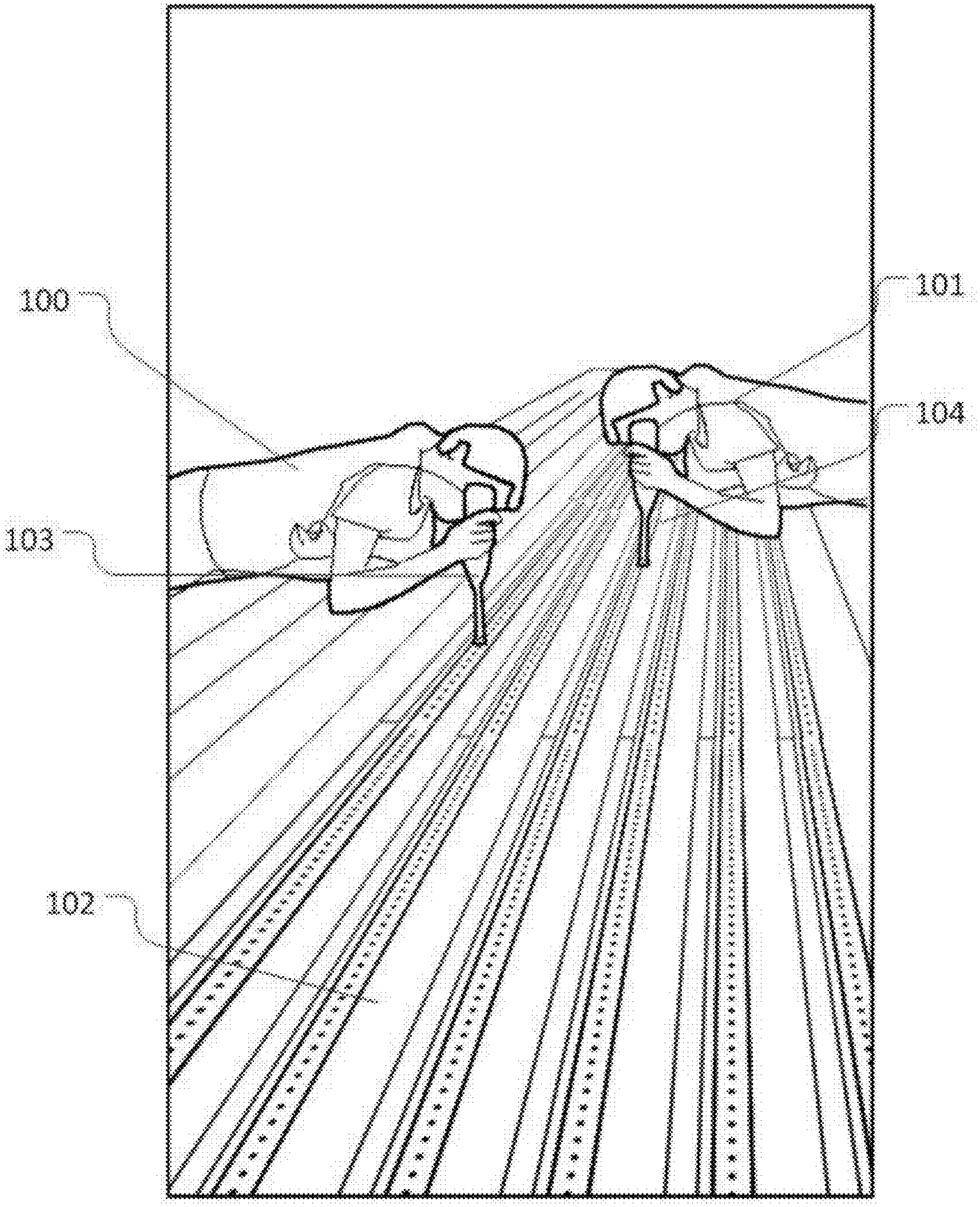
FIG. 1 shows a picture of the aircraft assembly technicians performing the caulking and sealing operation manually.

Referring to FIG. 1, there is shown a current manual sealing process. Worker 100 is applying a bead of seal on joints and worker 101 is applying a sealant dome on fasteners respectively, both on the wing section 102 using hand held dispensing devices 103 and 104 respectively. As can be appreciated this prior art technique is very labor intensive and prone to producing seals which may not be the most robust, as the workers tire during a shift.

Figure 2:
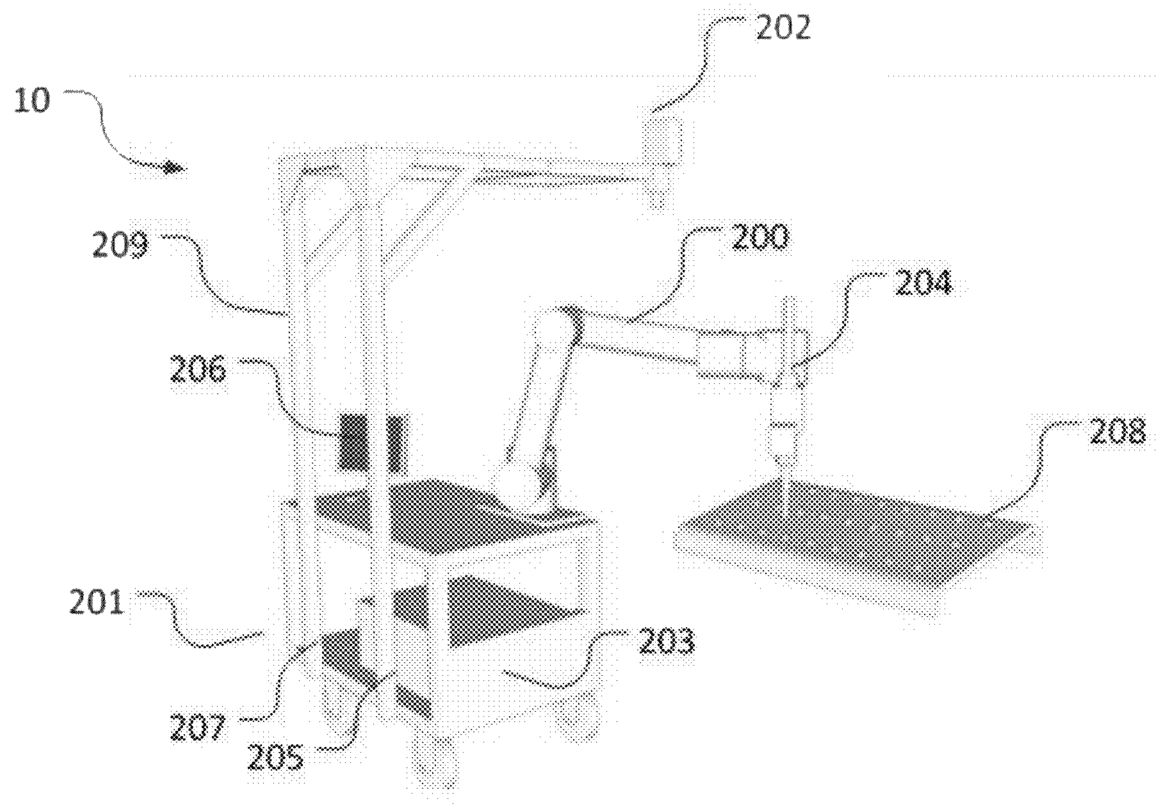
FIG. 2 shows a robotic sealing system mounted on a mobile platform (a push cart is shown).

An embodiment of the present computer implemented sealing system 10 is shown in FIG. 2. A positioning device which is a robotic manipulator or robotic arm 200 (hereinafter robotic arm) is mounted on a mobile platform 201 with wheels as shown in FIG. 2, or a wheeled gantry setup shown in FIGS. 20 and 21 or a fixed platform along which the robotic arm 200 can move shown FIG. 22. The platforms of FIGS. 20 to 22 will be described hereinafter. The robotic arm 200 may be a 6-DOF serial link robotic arm as shown in the FIG. 2 or a robotic arm with a different topology (e.g. parallel link robotic arm) or with a different number of degrees of freedom as long as it can position a tool in three (3) translational and three (3) rotational degrees of freedom at the tip of robotic arm 200.

The mobile platform 201 may be a manually operated push cart as shown in the FIG. 2, a motorized platform or a semi or fully autonomous vehicle. Its purpose is to provide gross positioning of said system relative to the part containing the features that are to be sealed. It may also be a platform which runs along a motorized linear stage as in FIG. 20, 21 or 22. An overhead camera 202 is mounted on a frame 209 attached to the platform 201 and observes a part 208 to be sealed. The camera 202 is interfaced with a vision processor 203. Overhead camera 202 may be considered a global vision sensor. Attached to robotic arm 200 is a dispensing system 204 for dispensing sealant on the joints or any other item to be sealed. A robot controller 205 is interfaced with the vision processor 203, the robotic arm 200 and the dispensing system 204. A touch-screen monitor 206 with the user interface is interfaced with the vision processor 203 is used by an operator to observe the system status and to command actions. An uninterruptible power supply or a battery 207 is mounted on the platform 201 to provide power to the system while moving between work sites.

The expression "vision system" refers to cameras 202, 302, rangefinder 301 interconnected with vision processor 203.

Both the vision processor 203 and the robotic arm controller 205 may be known microprocessors or computers which are configured to communicate with each other, the vision processor 203 being programmed with instructions or algorithms to analyze the real-time images from sensors 202 and 302, and any other additional sensors that may be included in various embodiments, and based on the analysis of these images, is further programmed with instructions or algorithms to instruct the robotic arm controller 205 to position the robotic arm 200 in pre-selected locations with the at least one feature to be sealed. Once the robotic arm 200 is positioned in the pre-selected location, the vision processor 203 (and/or the robotic arm controller) are programmed to activate the dispensing system 204 to dispense the sealant, and based on images acquired real-time during dispensing of the sealant, cease dispensing the sealant once it is determined that sufficient sealant has been dispensed. Alternatively, it will be appreciated by those skilled in the art that a single processor interfaced with both the cameras/optical sensors and the robotic arm may be used. This microprocessor or computer would be programmed with all the algorithms required for analyzing the images from the sensors and all the algorithms needed to control robotic arm 200.

Figure 3A:
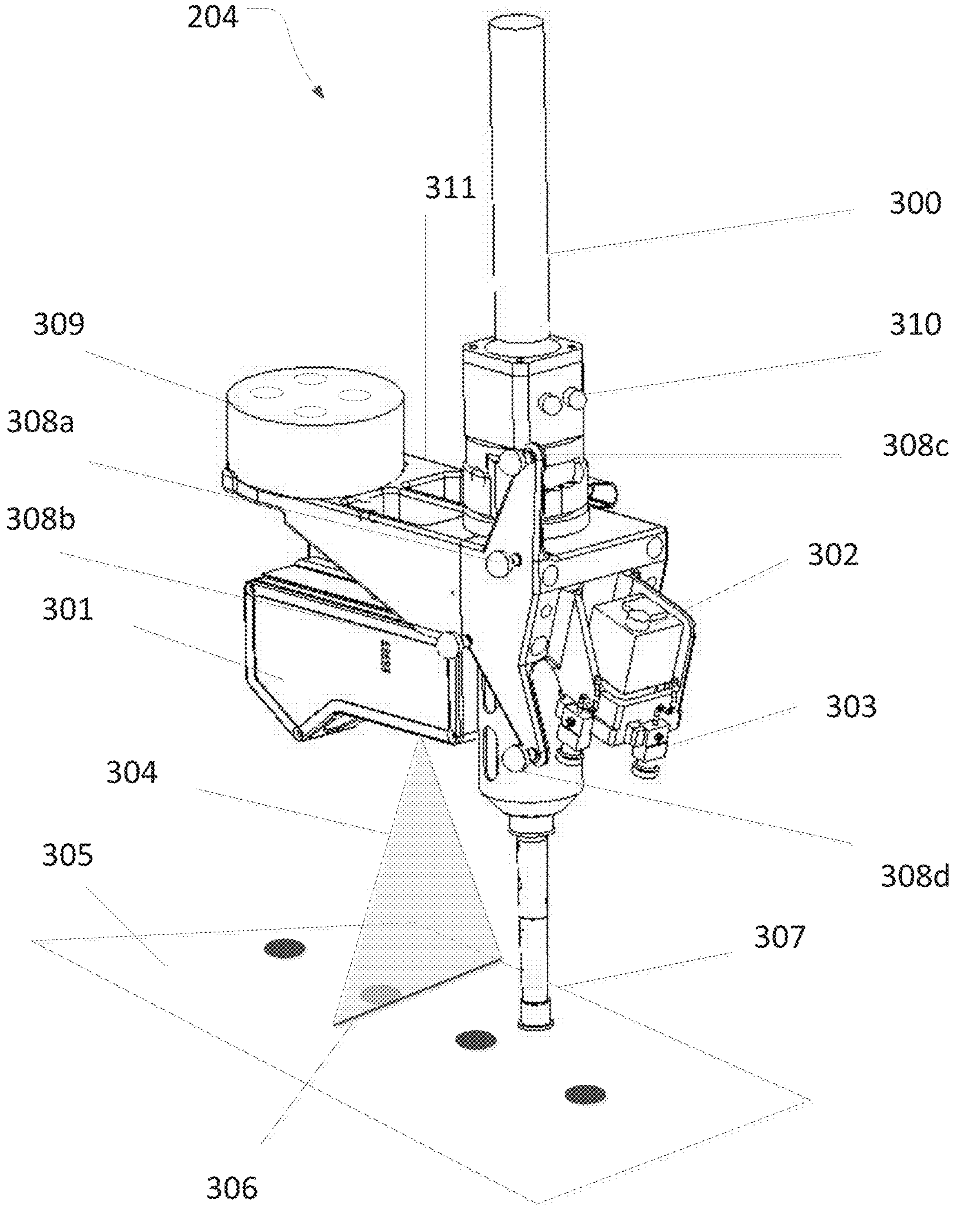
FIG. 3A shows an embodiment of the dispensing system disclosed herein mounted on a robotic end-effector.

The dispensing system 204 is shown in detail in FIG. 3A and is comprised of a dispensing device 300, a structured light rangefinder 301 and an observation camera 302 with lights 303. The rangefinder 301 projects a plane of light 304 on the section 305 of part 208 forming a light pattern 306 that is observed by a second camera (not shown) in the rangefinder 301 enabling computation in vision processor 203 of the three-dimensional distance to the light pattern on the part. In the embodiment shown in FIG. 3*a* the plane of light 304 is roughly paralleled to the longitudinal axis of the nozzle 307 and is placed in front of the nozzle 307. This has some advantages as the range is measured ahead of the nozzle 307 when creating a fillet seam; however, there is a disadvantage caused by the fact that the distance is measured with a certain parallax and not at the location where nozzle 307 is closest to the part. Re-orienting the plane of light 304 or rotating the rangefinder 301 will bring the plane of light 304 closer to the nozzle 307 thus reducing the parallax. The observation camera 302 observes the tip of the nozzle 307 of the dispensing device 300 and a portion of the part 208 to be sealed which is shown at 305 in FIGS. 3*a* and 3*b*.

The camera 302 is used to perform two tasks: 1) monitor and control the amount of dispensed sealant from the nozzle 307 as described below, and 2) to detect features to be sealed and provide input to the robotic controller 205 to instruct the robotic arm 200 to position the nozzle 307 at the preferred location for dispensing. Using one camera 302 for both tasks has an advantage as less hardware is required; however, this camera 302 has a reduced field of view due to the presence of the nozzle 307. In order to detect the next feature it might be necessary to move the dispensing system 204 to a location with unobstructed view, thus increasing the operation time.

An exterior three dimensional marker system 308*a*, 308*b*, 308*c* and 308*d* may be attached to the dispensing system 204 to provide an alternative means of locating the dispensing system 204 with respect to the part via means of an external camera system.

In some instances it would be advantageous to augment an existing robotic workcell with a dispensing capability. This would take the form of the dispensing system 204 shown in FIG. 3*a* and also the vision processor 203 which is shown in FIG. 2, but not shown FIG. 3*a*. The vision processor 203 may also be built into the dispensing system 204 to form a single intelligent add-on unit. More particularly, the combination of the dispensing system 204 with the vision processor 203 forms a vision guided dispensing system, or smart dispensing system, which may be retrofitted to existing robotic arms. The vision processor 203 is programmed with algorithms for analyzing the amount of sealant dispensed as well as the final shape of the produced seal. The dispensing system 204 may contain a metering device which tracks and records the amount of sealant dispensed, and this recorded amount of sealant dispensed in conjunction with the shape of the seal gives a comprehensive record of each produced seal.

The dispensing system 204 may be coupled with the robotic arm 200 tip either directly through a bolted interface at 311 or a force moment sensor 309 may be attached between them. The force sensor 309 enables detecting contact forces between the nozzle 307 and sealed parts. Advance/retract buttons 310 activate manual advancement or retracting of the plunger 405 (forming part of dispensing device 300 shown in FIG. 4) and lights indicating status may be integrated with the dispensing system 204. Alternatively, the force sensor can be integrated into the structure of the dispensing device 300. An alternative method of determining contact is by measuring torque increases in the robot arm 200 joints. This can be achieved through measuring torque at the output of each manipulator joint in the robotic arm 200 with explicit torque transducers, or by measuring the current of the motor in each of the robot arm 200 joints.

Figure 3B:
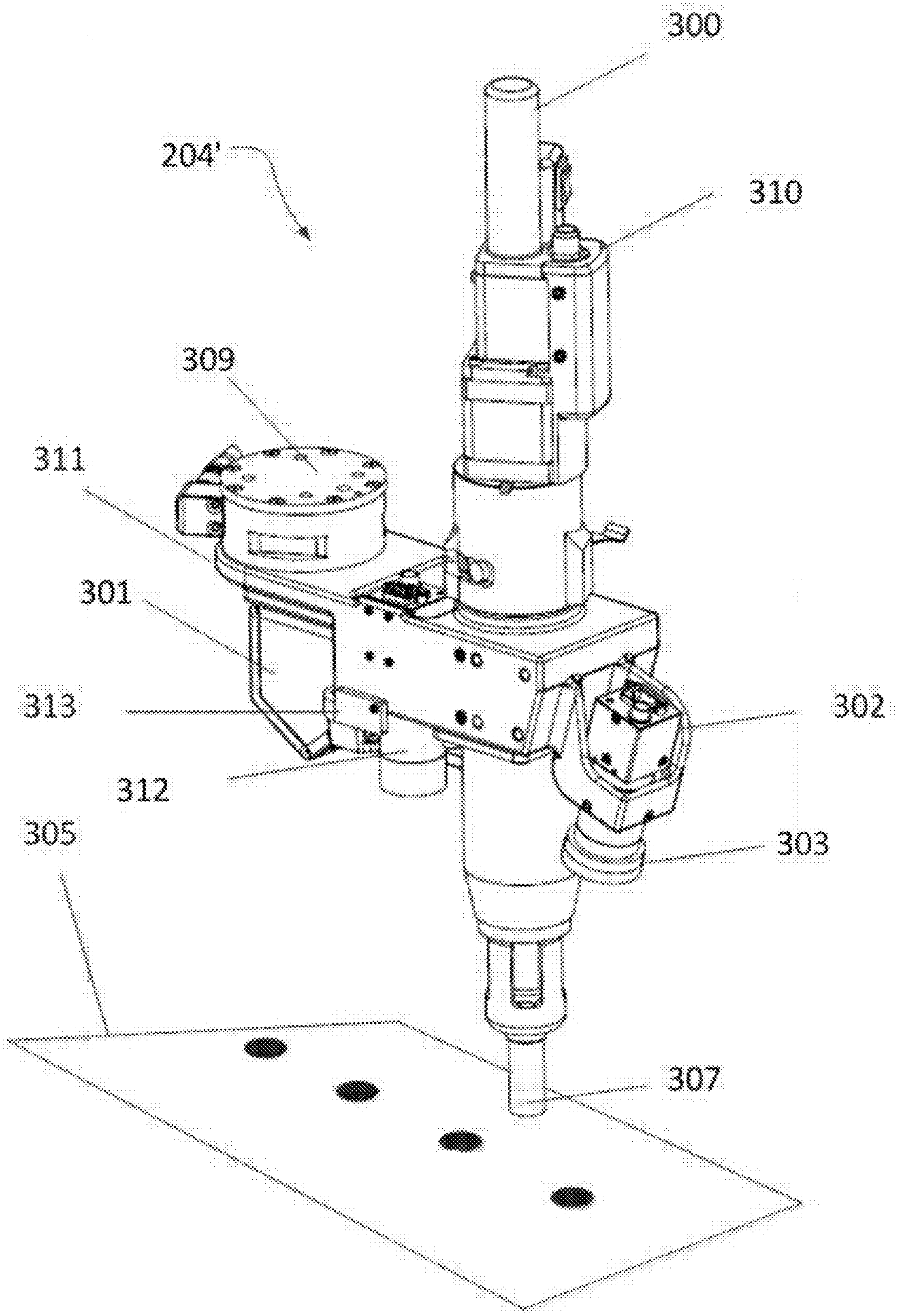
FIG. 3B shows an alternative embodiment of the dispensing system

An alternative embodiment of the dispensing system 204, which eliminates the need for additional robotic arm motions, is shown at 204' in FIG. 3*b*. Dispensing system 204' is similar to system 204 but includes an additional third camera 312 with a light 313 that is positioned to observe features in front of the nozzle 307 and without occlusions. This arrangement has an advantage over the dispensing system 204 in FIG. 3*a* as it is not required to move the dispensing system to capture an unobstructed image of the next feature leading to faster system operation.

Figure 4:
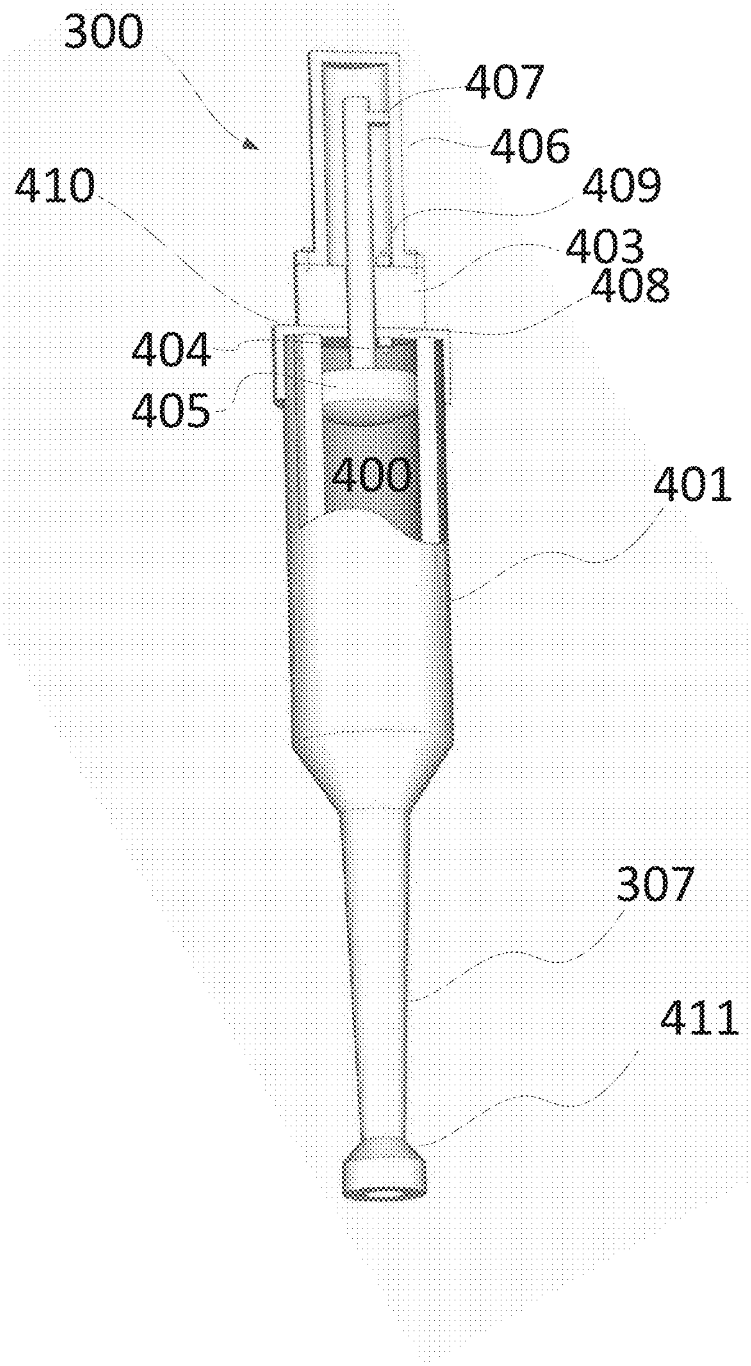
FIG. 4 shows a sealant dispensing device, which forms a part of the present dispensing system.

The dispensing device 300 with a motor driven lead-screw assembly is shown in cross-section in FIG. 4. Dispensing device 300 includes a cartridge 400 which is inserted into a cartridge holder 401 and a nozzle 307 is then attached to cartridge 400. The cartridge 400 is locked in place with a cap 410 with a twist-lock system. The cap 410 is attached to a motor 403, which drives a lead-screw 404 with an attached plunger 405 that enters the cartridge 400. As the plunger 405 moves down the sealant liquid is pushed out through the nozzle 307. A casing 406 of the motor 403 is attached to cap 410 and arrests rotational motion through an attached pin 407. The pin 407 triggers sensors at the top 408 and bottom 409 of plunger motion travel. The motor 403 with the lead-screw 404 is attached to the cap 410. The motor 403 may be a stepper motor driving the lead screw 404 directly or a servo motor coupled to the lead screw 404 through a gear box.

The nozzle 307 may be straight or bent to enable easy access to apply the sealant in difficult to access locations; and have a circular, oval or rectangular tip opening. The tip diameter may be expanded by attaching a cup 411 to the dispensing end of nozzle 307 to shape the sealant for deposition on the sealed part if required.

Dome Sealing

Figure 5:
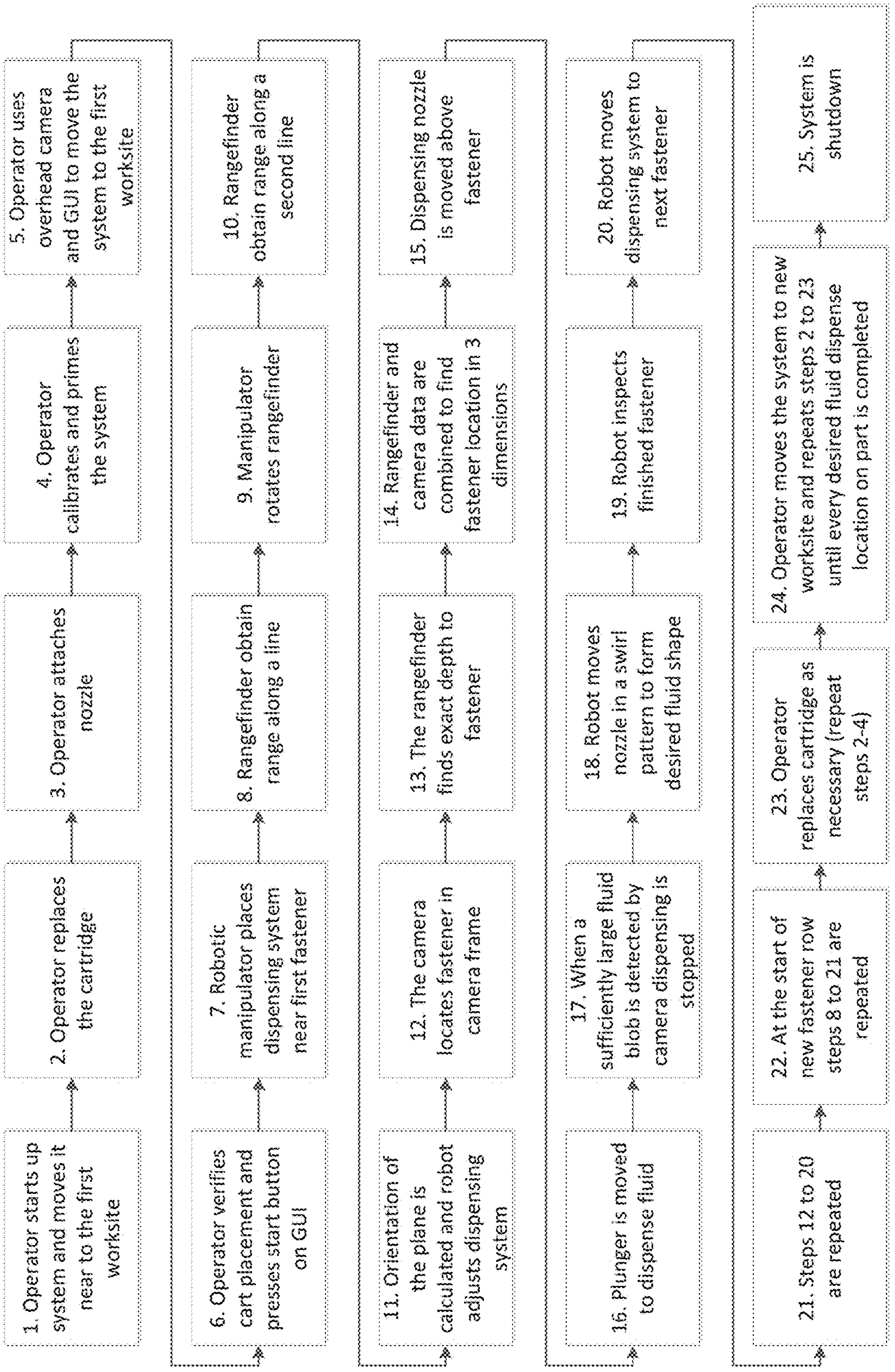
FIG. 5 shows a flow diagram showing the steps involved in the dispensing operations using the method and system disclosed herein.

A work flow diagram showing the steps involved in the dispensing operations for application of domes of sealant on fasteners using the method and system forming part of the present invention is shown in FIG. 5 with each step further described in detail below. Additional explanations for more complex steps are provided in sections below. The operation below is discussed with respect to dispensing system 204 but it will be appreciated that dispensing system 204' will function in essentially the same way.

1. The operator starts the computer implemented sealing system 10 and loads data files pertaining to the part of interest that will have fluid dispensed on it.
2. The operator opens the cartridge holder 401 mounted in the dispensing system 204 and replaces a cartridge 400 of the viscous fluid to be dispensed.
3. The operator attaches nozzle 307 to viscous fluid cartridge 400 and closes the cartridge holder 401 with a twist-lock system 410.
4. The operator may perform calibration using a calibration target and prime the nozzle 307 manually or the operator may initiate an automatic process and the system performs these operations automatically. Detailed descriptions are provided below.
5. The operator pushes the cart 201 to near the worksite while the vision system uses overhead camera 202 to look for the first worksite of the sealed part. The vision system alerts the operator when the platform 201 is near enough to ideal location to begin work. Details are provided below.
6. The operator confirms location using the touch-screen 206 and initiates sealing operation.
7. The robot controller 205 commands the robotic arm 200 to move the dispensing system 204 near to the first fastener.
8. The vision system in conjunction with overhead camera 202 scans the surface with rangefinder 301 and determines distance to the part 208 along the projected line 306 as seen in FIG. 3*a*. Details are provided below.
9. The robot controller 205 commands the robotic arm 200 to rotate approximately about optical axis of rangefinder 301 and/or translates it.
10. The vision system scans surface of part 208 a second time and determines distance to the part 208 along the projected line 306. Details are provided below.
11. The vision system determines a plane of best fit and based on this information the robot controller 205 commands the robotic arm 200 to adjust the dispensing system longitudinal axis to be locally normal to the surface of part 208. This computation may rely on calculating the cross product of the step 9 and 11, which is the surface normal of the plane that the fastener is located on.
12. The vision system uses dispensing system camera 302 to find location of fastener with respect to the camera 302. Details are provided below.
13. The vision system uses the rangefinder 301 to find the depth of the fastener with respect to the nozzle 307. The vision system uses camera 302 to capture a reference image of the fastener to be sealed. Details are provided below.
14. The vision system uses combined rangefinder 301 and camera 302 data to find the location of the fastener in three (3) translational dimensions with respect to the dispensing system 204.
15. The robot controller 205 commands the robotic arm 200 to move the dispensing system 204 over the fastener. The robotic arm force control is activated to limit the force in case of unwanted contact with the sealed part 102.
16. The vision system commands the dispensing device 300 to dispense a suitable amount of fluid by actuating the motor driven lead-screw 404. Details are provided below.
17. The vision system commands the dispensing device 300 to stop motion and retract the plunger 405 when a sufficiently large amount of fluid is detected. This detection can be accomplished via measurement of the fluid blob diameter.
18. The robot controller 205 commands the robotic arm 200 to move the tip 411 of the nozzle 307 in such a way that the viscous fluid is laid into its desired final shape prior to fluid hardening. Typically a swirl (a 3D helix-like motion) is executed to ensure that remaining sealant is deposited on the dome without contaminating the part, see FIG. 17).

19. The robot controller 205 commands the robotic arm 200 to move dispensing system 204 back to position mentioned in step 13 and performs an inspection by recording a comparison 2D or 3D image. Detailed description is provided below.
20. The robot controller 205 commands the robotic arm 200 to move the dispensing system 204 to a low hover position over the next fastener location based on pre-planned data files and positions of the recently detected fasteners.
21. Steps 12 through 20 are repeated.
22. If necessary based on data files (e.g. next fastener is not co-planar with previous fastener) the system will repeat steps 8 to 11.for fastener localization before repeating steps 12 through 20 for a subsequent set of fasteners
23. When limit switch 409 in the dispensing device 300 detects a finished or empty cartridge 400 the dispensing process is paused and the robotic arm 200 moves the dispensing system 204 away from the part 208. The operator is flagged for a cartridge change and repeats steps 2 to 4 prior to pressing resume.
24. When a worksite is finished, the operator is flagged by the system and instructed to move to the next stored worksite for the part of interest repeating steps 2 to 22 until entire part 208 has fluid dispensed on it in desired locations.
25. The sealing system 10 is moved away from worksite and shut-down.

Figure 6:
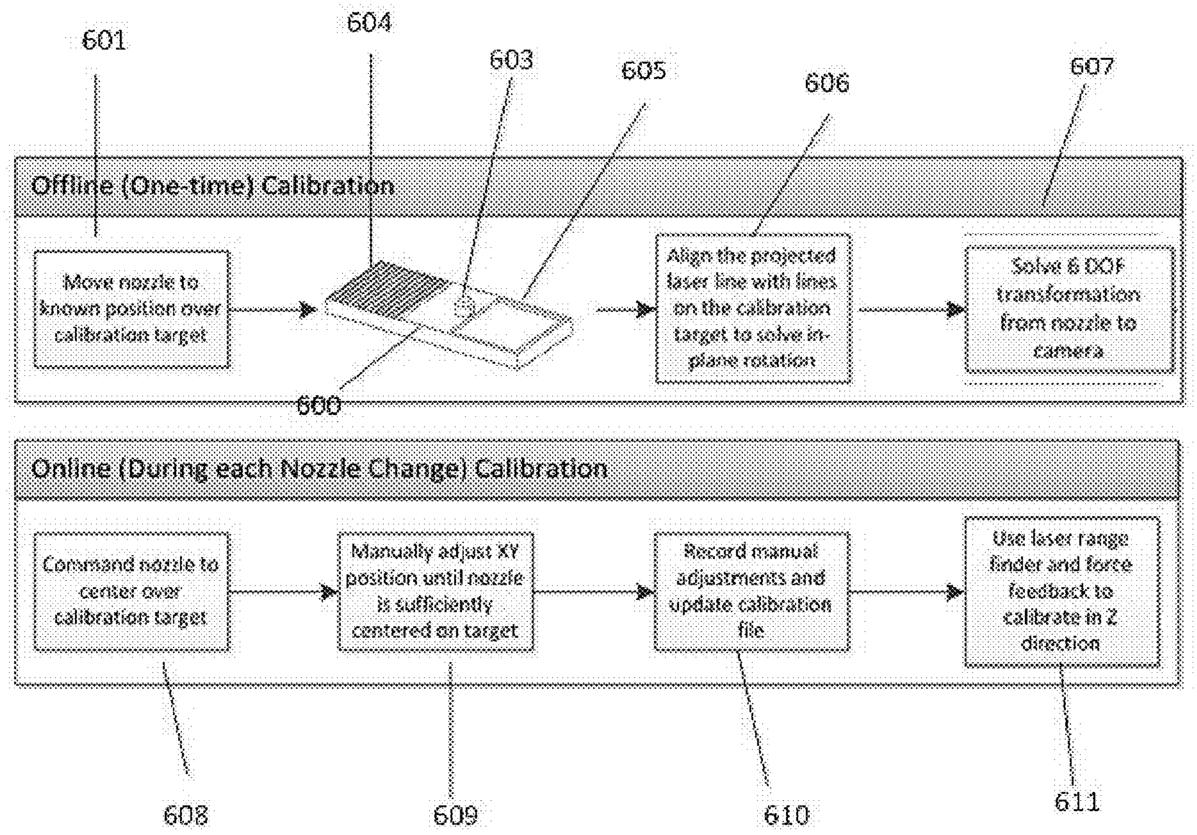
FIG. 6 shows a flow diagram showing the steps involved in the offline and online calibration processes used in the method and system forming part of the present invention FIG. 7 pictorially shows how the location of a fastener is computed.

With respect to item 4 above, a detailed description of the nozzle 307 calibration and priming is shown in FIG. 6. Manual off-line calibration is performed using a special calibration target 600 shown in FIG. 6 and consisting of separate sections for placing the tip 411 (FIG. 4) of nozzle 307 at a known location on the calibration target 600, patterns 604 (in this particular embodiment, the patterns 604 are a series of parallel lines), and a calibration target 605 to be viewed by the camera 302. The operator inserts the nozzle 307 onto the post 603 (step 601), rotates the calibration target 600 so as to align the line projected by the rangefinder 301 with the series of lines on the target 604 (step 606), and activates the vision system to capture an image of the calibration target 605. In an alternate embodiment, instead of the human operator inserting the nozzle 307, the robot arm 200 positions the dispensing system 204 nozzle onto the post with the benefit of the force-control function in the robot controller 205. The image is processed to compute external camera calibration parameters and relates the geometry of the nozzle tip 411, with the rangefinder 301 and camera 302 (step 607). This calibration need only be performed once as long as the camera pose does not change with respect to the frame of the dispensing system 204.

The dispensing system 204 (or 204') may be configured to ensure that the nozzle 307 is always in the same relative position with respect to the sensors and robotic arm 200 after replacing a cartridge 400 or a nozzle 307. If this is not the case then an in-situ (online) calibration may be performed when a new cartridge 400 or nozzle 307 is installed. The operator may use a touch-screen or another input device to command the manipulator to move the nozzle 307 to center over a visual target within reach of the manipulator such as a checkerboard, a grid of circles or even a circle from the dispense position (steps 608 and 609). The X, Y and Z offset between the new nozzle location and original dispense position is recorded as the calibration and applied to the rest of fasteners (steps 610 and 611).

The calibration procedure can be automated by using the dispensing system camera 302 to align the nozzle 307 with the visual target. The depth is calibrated by a) maneuvering the tip 411 of the nozzle 307 to touch the target and record the depth value using the rangefinder 301; b) command the robotic arm 200 to a predefined height with respect to the vision target; c) visual servo X and Y position of nozzle 307 using camera 302 until the nozzle 307 aligns with a feature in the calibration target (605) within desired accuracy. Visual servoing is accomplished by taking the relative pose of the nozzle tip 411 with regard to the calibration target 605 and using a control loop in the robotic arm controller 205 to adjust the position of the nozzle tip 411 in a plane parallel to and above the vision target 605.

Once the dispensing system 204 is calibrated, the operator manually advances the plunger 405 to fill up the nozzle 307 with sealant by manually activating a button 310 on the dispensing system 204 or using a touch-screen 206 command.

The priming procedure can be automated by using the camera 302 in the dispensing system 204 to monitor the flow coming out from nozzle 307. During the automated procedure, the size of the nozzle 307 in the image is computed by the detecting its projection in the image and estimating the size, using for example, blob detection and measurement technique. The dispensing device 300 is commanded to advance the plunger 405, which causes the sealant to flow. Once the vision system detects an increase in the projected blob size by a pre-defined threshold value, this indicates that sealant is coming out from the nozzle 307 and the nozzle 307 is primed. The vision system commands the dispensing device to stop advancing the plunger 405 and to retract it by a predefined amount to release the pressure inside the cartridge 400 and to prevent leakage. The computer implemented sealing system 10 may proceed automatically to the next step or the operator may be notified to inspect the nozzle 307 before proceeding to the next step.

With respect to item 6 above, the vision system alerts operator when the mobile platform 201 (FIG. 2) is near enough to the ideal location to begin work. The operator confirms location and initiates the fluid dispensing operation using the touch-screen 206.

1) A GUI overlays the part model at canonical pose onto the live image stream of the camera 302.
2) The operator manually moves the platform 201 to align the model with the image in the GUI.
3) Once the model and image are approximate aligned, the operator presses a GUI button to execute pose refinement function.
4) A model based 3D pose estimation algorithm solves part pose with respect to the camera to a high accuracy. The algorithm is based on the nonlinear optimization that minimizes the error of projected model contours with the ones extracted from live image. The algorithm is efficient as the operator has already roughly positioned the cart to the correct pose and only a small pose parameter space need to be explored to solve the problem.
5) The refined result is overlaid on the live image and the operator is required to confirm the location.

With respect to item 8 above, the vision system scans surface with the rangefinder 301 and determines line of best fit using the following steps.

1) Extract a predefined number of points that are located on the flat surface in front of a fastener.
2) Fit a line to the points by using, for example, the Random sample consensus (RANSAC) algorithm or another algorithm with similar functionality.
3) Output the direction of the line as a 3 by 1 vector.

With respect to item 10 above the vision system scans the surface of workpiece 208 with the rangefinder 301 for a second time and determines a second line of the best fit.

With respect to item 12 above the vision system uses the dispensing system camera 302 (FIG. 3*a*) or 312 (FIG. 3*b*) to find location of fastener with respect to the camera. If the camera 302 is a 2D camera then the following algorithm may be used, see FIG. 7A.

1) The type of the fastener and its approximate location in the image is known from the CAD model of the part and the approximate location of the part with respect to the mobile platform 201.
2) The vision system uses a dynamic thresholding algorithm such as the Otsu algorithm to create a binary image, this algorithm or comparable algorithms are programmed into the vision processor 203
3) A blob detection algorithm is utilized to locate the fastener in the binary image.
4) Output a ray 701 (3 by 1 vector) defined by the projection center of the camera 302 and the centroid of the blob representing the fastener 700 in the image and finding its intersection with plane of the part. This provides the 3D location of the fastener center.

Figure 7:
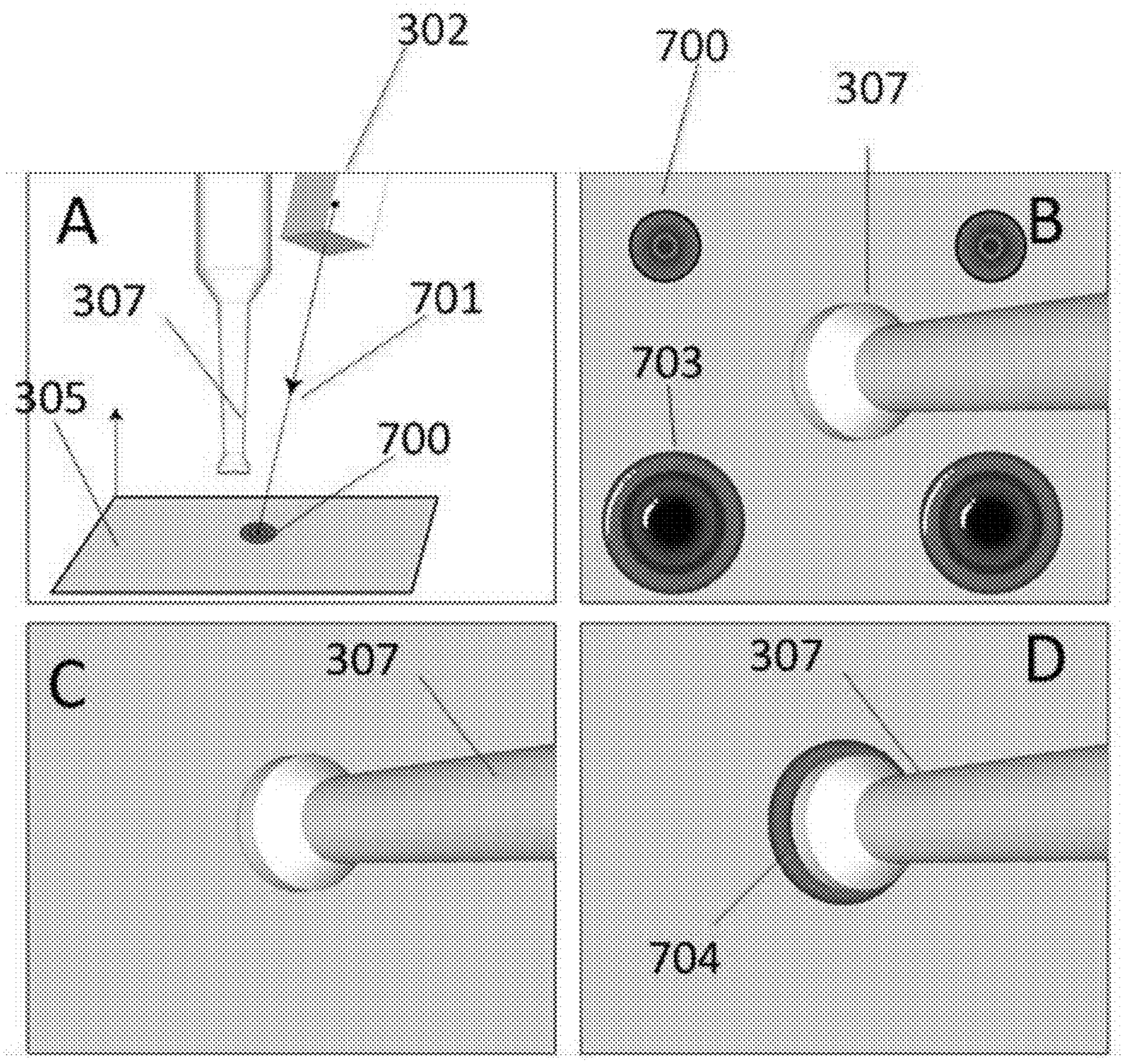

With respect to item 14 above the vision system processor 203 uses combined rangefinder 301 and camera 302 data to find the location of the fastener in three (3) dimensions with respect to the dispensing system. FIG. 7A shows a side view of this geometry: camera 302 observes the nozzle 307 and a fastener 700 on the part 305. An image from the camera 302 is shown in FIG. 7B, and includes the nozzle 307, the fastener 700 to be sealed and a fastener 703 that has already been sealed. The 3D location of the fastener 700 to be sealed with respect to the dispensing system camera 302 thus can be solved by finding the intersection of the ray 701 passing through a center of the fastener 700 with an image plane of the camera 302 and using a standoff distance obtained from the rangefinder 301.

Alternatively, the dispensing system 204 can be placed at a required stand-off distance by using the force sensor 309 (FIG. 3*a*) and the camera 302 and without the need for rangefinder 301. The dispensing system 204 needs to be placed above the fastener 700 to be sealed using above described vision processing. The robotic arm 200 is commanded to lower the dispensing system 204 until contact between the nozzle 307 and part the surface of part 208 on which the sealing procedures are being conducted is detected by the force sensor 309. The data from the force sensor 309 can be used to align the nozzle 307 perpendicularly to the surface of part 208 being sealed. From this position the robotic arm 200 is commanded to raise the dispensing system 204 by the required stand-off distance.

With respect to item 17 above the vision system processor 203 commands the dispensing system 204 to stop motion and retract plunger when a sufficiently large amount of fluid is detected. This detection can be accomplished via measurement of fluid blob diameter. FIG. 7C shows the nozzle 307 in a position at a predefined distance above the fastener 700 before the sealant is dispensed. The actual fastener is obscured by the nozzle 307. FIG. 7D shows the image from the same position after the dispensing device has been actuated and the sealant 704 is being dispensed. The flowing sealant forms an approximately circular shape on the surface of the part. The images 7C and 7D can be processed by using this algorithm 1) Threshold the image using the Otsu or a similar algorithm and create a binary image,
2) extract contour of the dispense nozzle/sealant from the binary image,
3) correct the contour for the projective distortion, assuming planar surface of the part and using known orientation and standoff distance of the camera, by re-projecting it onto plane parallel to the part surface,
4) compute the average radius from the points on the corrected contour to the center of nozzle,
5) once the average radius grows equal or larger to a pre-defined threshold, command the dispensing system 204 to stop motion and retract plunger 405, and
6) push down the nozzle 307 (i.e., reduce the gap between the nozzle 307 and plane) to a pre-defined value during 5) or until contact is detected with the force sensor 309. This ensures proper adherence of the sealant to the surface and size of the dome.

Figure 8:
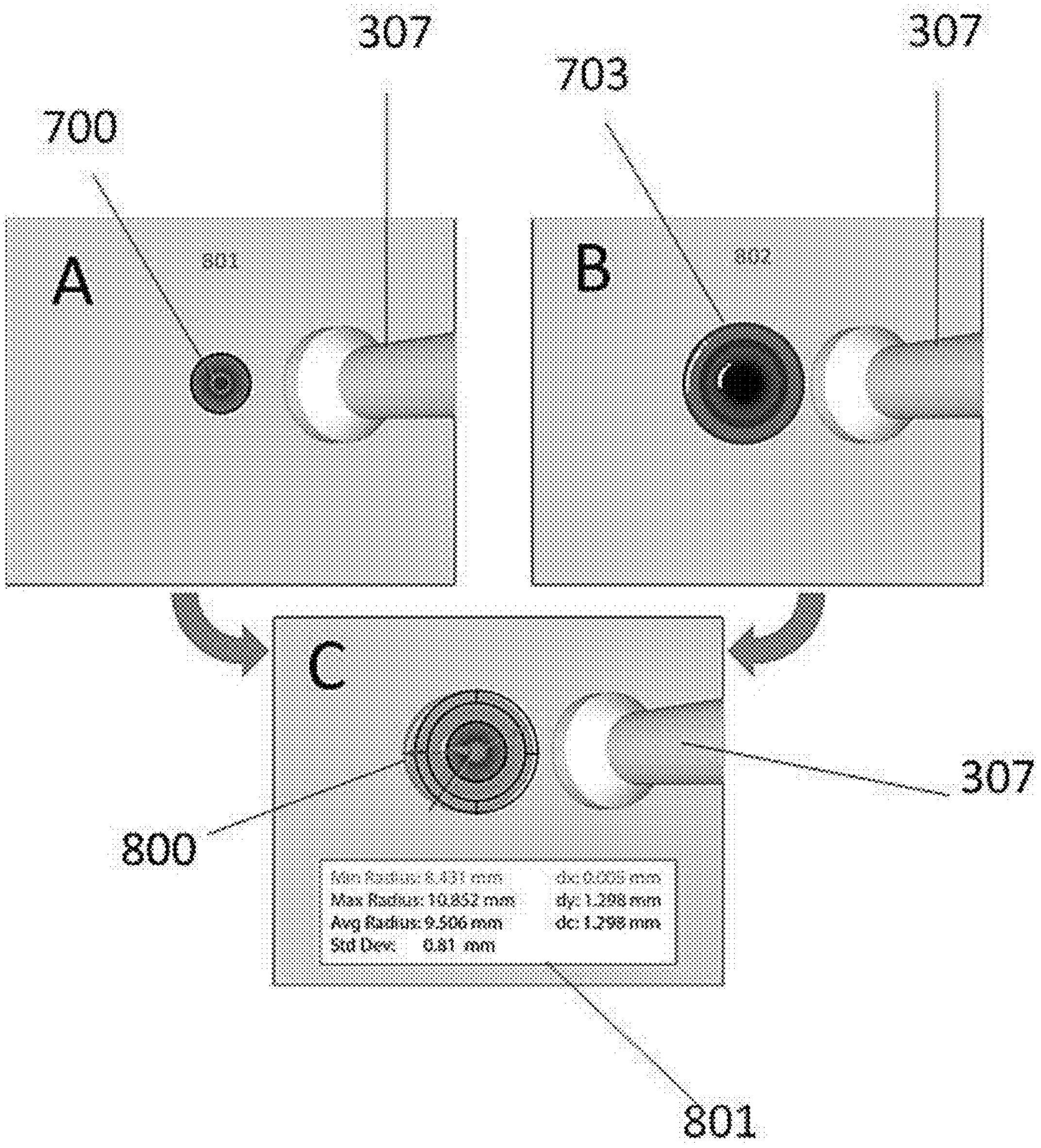
FIG. 8 pictorially shows how 2D inspection of a dome is performed

With respect to item 20 above, hereunder is a detailed description of the inspection process which occurs after deposition of the dome seal to determine its quality. The 2D inspection is illustrated in FIGS. 8A to 8C and relies on capturing an image of an uncovered fastener 700 (FIG. 8A) and a sealed fastener 703 (FIG. 8B) from the same hover location (vantage point). As the repeatability of robots is very high (for example, 0.1 mms is a typical repeatability for industrial robots) the comparison image (FIG. 8C) can be created by directly overlaying images from FIGS. 8A and 8B and constructing a composite image in FIG. 8C. The offset 800 between the center of the fastener 700 and fluid blob 703 is computed by the vision processor 203 and stored in an inspection database. Also computed is the maximum and minimum radii of the fluid blob from the fastener center, smoothness of contour and circularity of contour for tail detection. Tails are extraneous sealant left as a trailing thread from the dome as the nozzle separates from the just deposited seal. The characteristics of the deposited seal, offset 800 such as minimum radius, maximum radius, average radius, standard deviation and smoothness of contour and circularity of contour can be displaced on the touch-screen monitor 206 as shown in the display screen 801.

If the robotic arm repeatability is not sufficient for alignment of the images shown in FIGS. 8A and 8B, then the alignment may be further improved by using an external 3D tracking system that will estimate pose of the dispensing system and allow the robot controller 205 to adjust the pose with a higher accuracy. Targets 308*a*, 308*b*, 308*c* and 308*d* can be used for accurate estimation of this pose.

Similarly, the 3D inspection relies on capturing two 3D images from the positions before and after dispensing. If a 3D camera is used, then these images can be captured directly from the same location before and after sealing. In the preferred embodiment the rangefinder provides 3D data along the projected pattern. Therefore to create a 3D image the robotic arm moves the rangefinder 301 in the dispensing system above the fastener 700 (or dome 703 when the sealing is complete) and the system records simultaneously the range data and robotic arm tip position. This approach allows for creating 3D images, which may be then represented as 3D pointclouds or surfaces and used to compute the relative position of the fastener and dome seal, amount of the sealant deposited, smoothness of the surface, thickness of the sealant and to detect extraneous sealant (tail), insufficient coverage or air bubbles.

Figure 9:
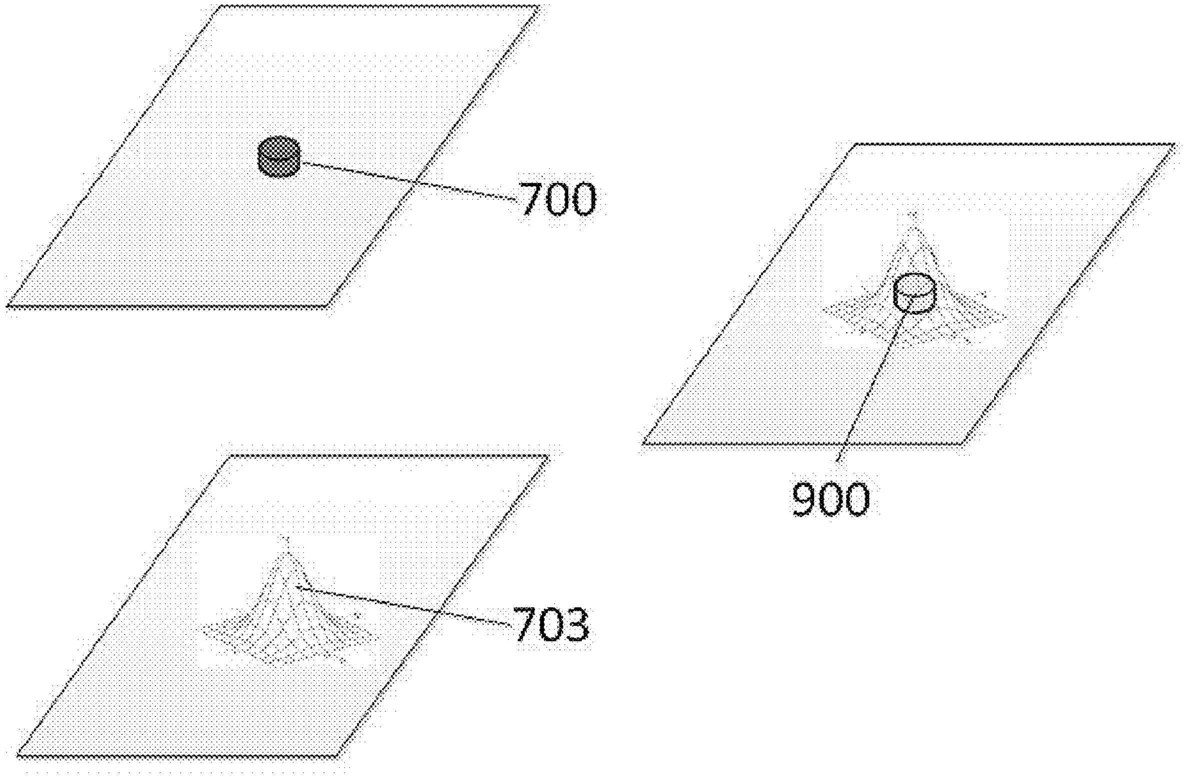
FIG. 9 shows how 3D inspection of a dome is performed.

FIG. 9 shows side views of a sealed part with a fastener before sealing shown at 700 and after sealing shown at 703. The rangefinder 301 captures 3D shapes, which the can be combined together as shown at 900 in FIG. 9. It is possible then to calculate the volume of the deposited sealant by subtracting volume of the unsealed fastener at 700 from the volume of the sealed fastener 703, maximum and minimum radii of the fluid blob from the fastener center, smoothness of contour, and detect a tail or other defects of the sealant dome.

The shape of the seal is not limited to only domes. By using a combination of a different nozzle with appropriate aperture and employing an alternate motion trajectory the dispensing system, alternatively shaped seals such as cones can be deposited.

Fillet Sealing

Figure 18:
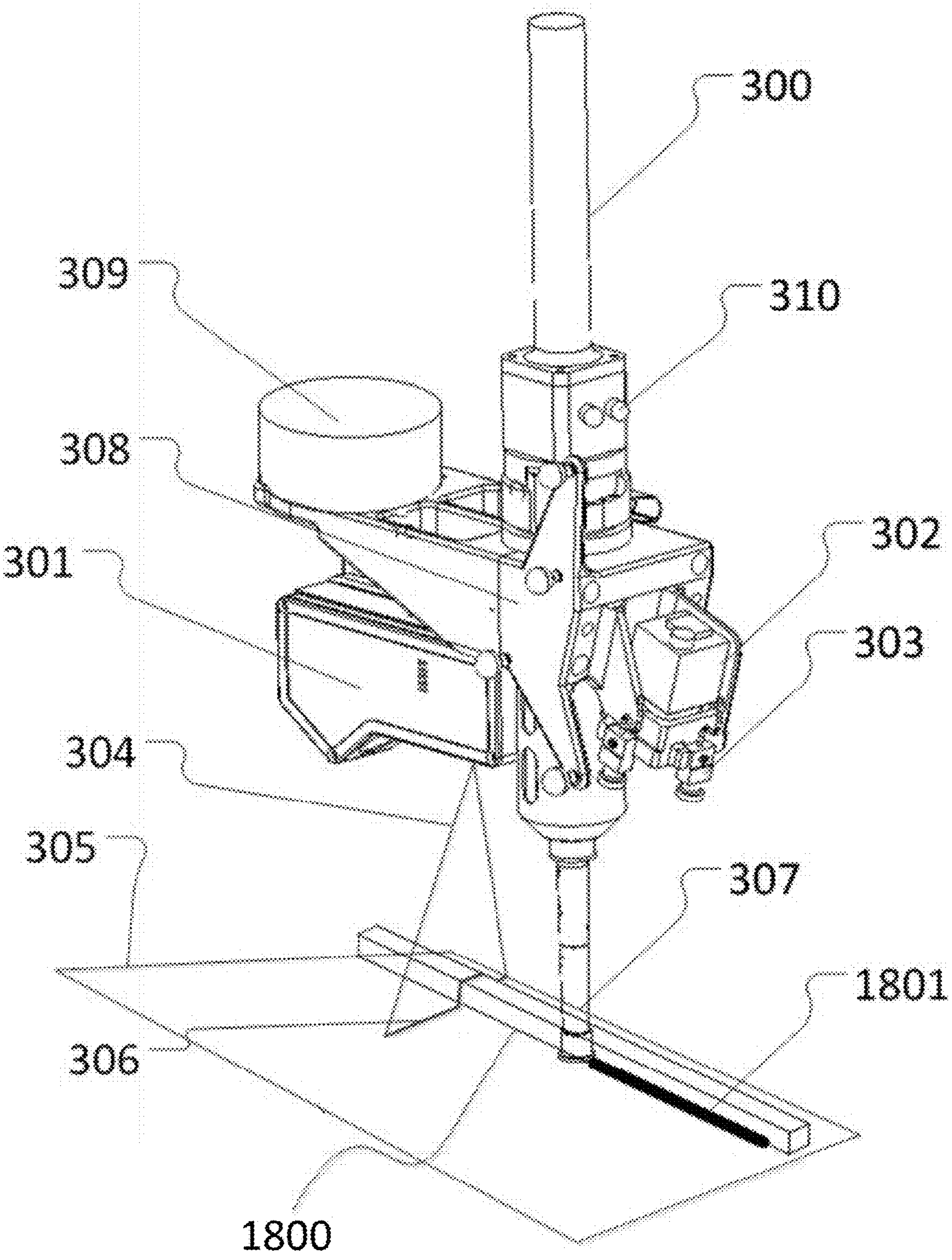
FIG. 18 shows a sealing of filet joints using the system disclosed herein.

FIG. 18 shows vision guided laying of fillet seals. Previously stored part location data is used to command the dispensing system 204 to an approximate location and the rangefinder 301 data or camera 312 images are used to locate the joint (such as Tee or lap) 1800 position, orientation and a starting point. Range data from the rangefinder 301 is processed by the vision processor 203 in real time to estimate the location of the joint 1800. This information is provided to the robot controller 205 to adjust the trajectory. Alternatively, if contact between the nozzle 307 and the part is required the force sensor 309 data can be used to adjust the motion of robotic arm 200. The camera 302 acquires images of the nozzle tip and deposited sealant 1801. The images are processed enabling real-time control of the sealant flow from the dispensing device 300 to achieve suitable width, shape and quality of the sealant bead allowing for in-situ inspection of the seal. The control may rely on computing the width of the deposited sealant and sending commands to the dispensing device to increase or reduce the advancement of the plunger.

Alternatively, the width control may be achieved by increasing or decreasing speed of the dispensing tip of nozzle 307 with respect to the sealed part by commanding the robotic arm 200. The camera 302 may be a 2D camera as in a preferred embodiment, a 3D camera or another structured light rangefinder operating under same principle as rangefinder 301. Alternatively, the control may be performed in 3D by using a second rangefinder, similar to rangefinder 301, but placed behind the nozzle 307 and observing a finished fillet seal. The first rangefinder 301 will capture a 3D pointcloud representing the sealed parts, whereas the second one will capture a 3D pointcloud representing the surface of the actual fillet seal. These two pointclouds can be aligned in 3D using known spatial placement of the rangefinders and timestamps on the acquired 3D data. The volume between these two pointclouds represents the deposited sealant compound. Analyzing the shape, size and specific dimensions of this volume will enable the assessment of the quality of the fillet seal in a similar way to inspecting the dome seals. This might include placement of the sealant with respect to the edge, width, height and volume of the seal, and shape of the cross-section.

Figure 19:
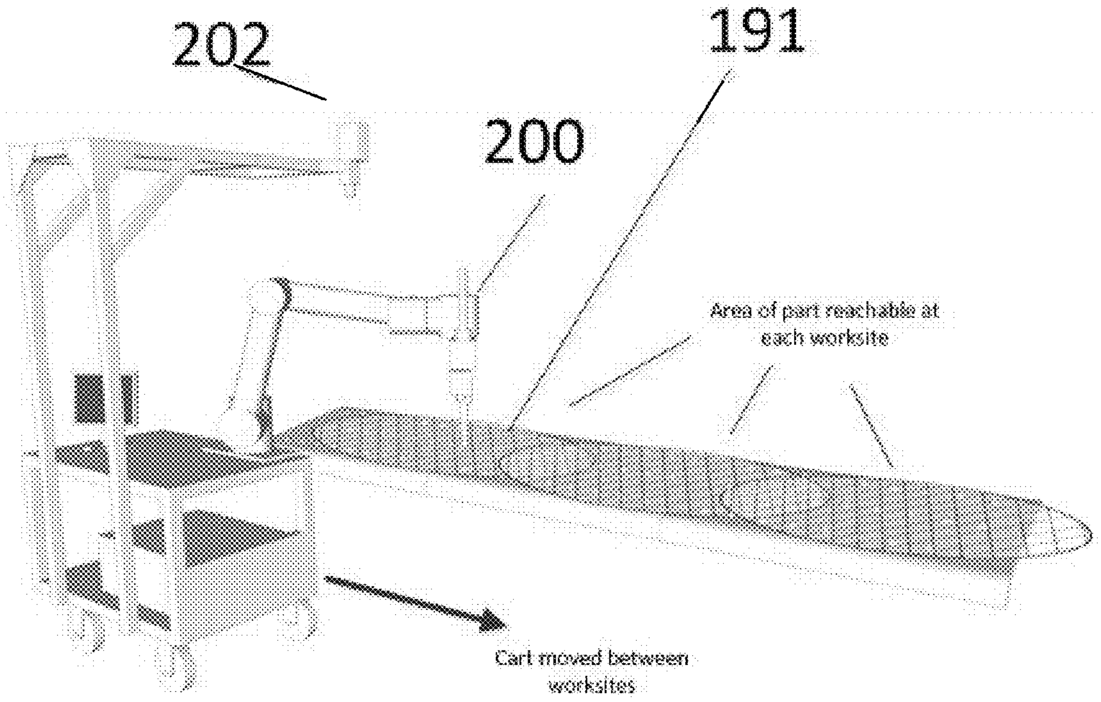
FIG. 19 shows worksites reachable from one location.

FIG. 19 shows the reach 191 of the robotic arm 200 from one location of the mobile platform 201. Many industrial structures 208 needing to be sealed, such as but not limited to, aircraft wing panels, are long and exceed the reach of the robot manipulator 200 in the setup shown in FIG. 19, such that the mobile platform 201 must be moved to successive locations along the part 208.

Figure 20:
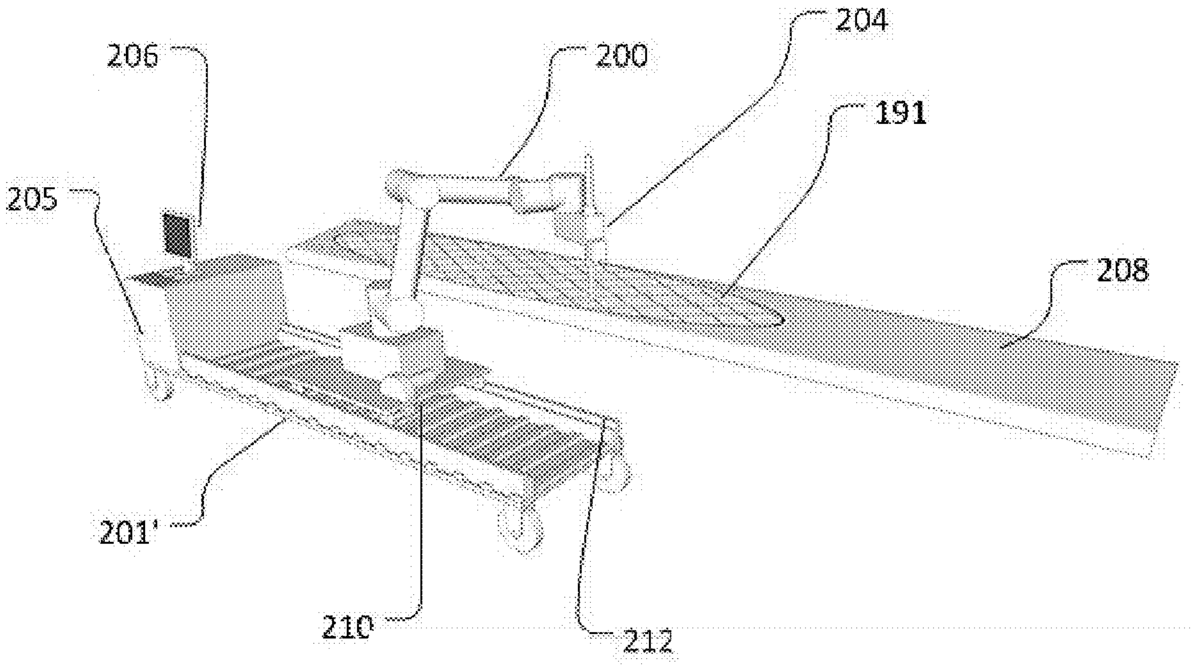
FIG. 20 shows an alternative embodiment of the robotic arm mounted on a mobile gantry.
Figure 21:
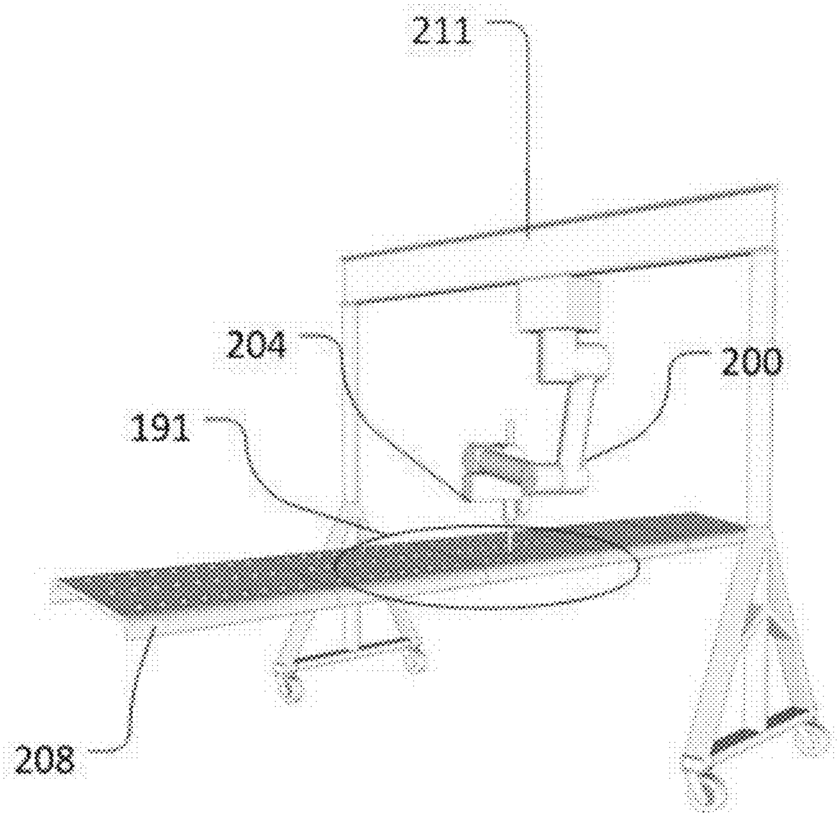
FIG. 21 shows an alternative embodiment of a robotic arm suspended from a mobile gantry system.

Referring again to FIG. 2, moving the mobile platform 201, either manually or autonomously, requires interrupting the sealing process, stowing the robotic arm 200, moving the platform 201 and registering the position of the robotic arm 200 with the part for the sealing process to continue. This slows down the process and may require operator intervention. Referring to FIG. 20, an alternative embodiment of the mobile system is shown where the robotic arm 200 reach is extended without moving the mobile platform 201' through the use of a linear motion base stage. This reduces the need to move the platform 201' as many times as platform 201, reduces operation time and operator's involvement. In this embodiment the robotic arm 200 is mounted on a translating base 210, which runs on a linear motion track 212 along the length of a the mobile platform 201'. The sealing system 10 is delivered to a worksite and registered as before. When the robotic arm 200 nears to its maximum reach, the translating base 210 is translated along the linear motion track 212, thereby moving the base of the robotic arm 200 along the sealed part 208 thus extending the reach of the robotic arm 200. The length of the linear motion track 212 may be multiple times of the reach of robotic arm 200, for example from 2 m to as long as the wing length when it is aircraft wings being sealed. This length is selected depending on the length of the sealed part and the required maneuverability Referring to FIG. 21, an alternative embodiment of a mobile system for positioning the robotic arm 200 is shown, wherein the robotic arm 200 is suspended from a mobile gantry system 211 above the part 208 being sealed. This approach also extends the lateral reach of the system from one location of the mobile platform as the robotic arm 200 can reach on both sides of its base. The mobility enables accessing the whole part along the longitudinal axis of part 208. This can be done manually by pushing the gantry 211 or by having the base of the gantry being motorized for semi-autonomous or autonomous motion with respect to the part.

Figure 22:
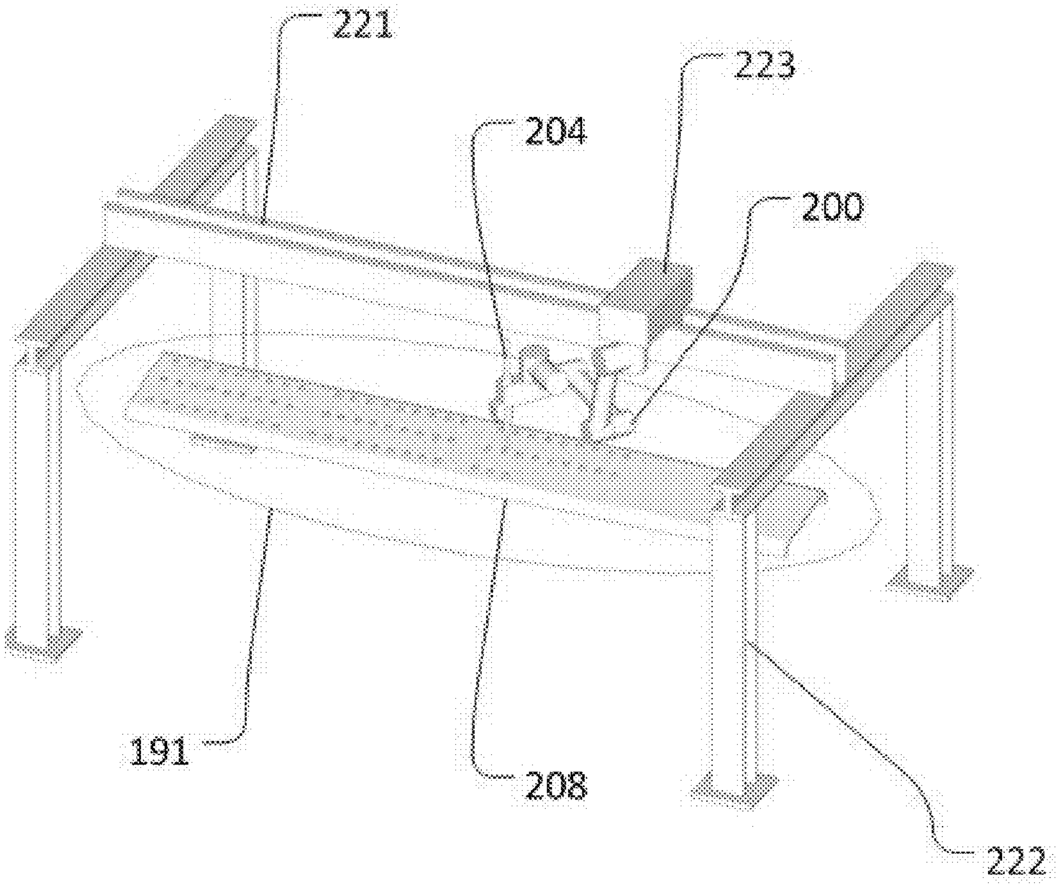
FIG. 22 shows an alternative embodiment of a robotic arm suspended from a fixed gantry system.

Referring to FIG. 22, an alternative embodiment of a mobile system for positioning the robotic arm 200 is shown, which includes a gantry 222. The robotic arm 200 is attached to a mobile base 223 that can move along the rail or beam 221. This provides access to the whole or a large portion of the part 208 by moving the robotic arm or the part along beam 221. FIG. 22 shows an embodiment that extends the reach 191 in both lateral and longitudinal dimensions of the part 208 as mobile base 223 moves robotic arm 200 along beam 221.

The alternate embodiments shown in FIGS. 20 and 22 eliminate many or all of the time consuming movements of the manual or motorized mobile base 201 motions in FIG. 1. This facilitates a much faster overall sealing operation, particularly because the re-registration of the base to the part is not required. The alternate embodiments shown in FIGS. 20 and 22 also afford a further alternate embodiment of performing a scan of a large part of or the entire wing section prior to beginning of the sealing operation. The dispensing system 204 and the vision system can be translated along the length of the wing to determine the location of the features to be sealed with respect to the sealing head for given manipulator and mobile platform locations. Such a scan can enable faster localization of the fasteners once the actual sealing operation is executed. When fillet sealing operations are also performed the following additional actions are performed:

1. After fastener sealing at a worksite is performed the sealant nozzle 307 is swapped for a fillet sealing nozzle by the operator.
2. The operator initiates fillet sealing operation for a worksite by using the touch-screen.
3. The robotic arm 200 moves dispensing system 204 near to start location of fillet seal.

4. The robotic arm 200 moves nozzle down until contact is detected with workpiece through force sensing 309 or suitable standoff using the vision system detection.
5. The robotic arm 200 moves nozzle in a direction towards the part joint stopping when sufficient force is reached or the vision system detects that sufficient sideways traversal has occurred.
6. The robot controller 205 initiates the dispensing of fluid along part joint as the robotic arm moves the nozzle 307 along to the joint.
7. After the robot controller 205 has determined that sufficient distance has been travelled based on stored CAD data or vision system estimation or the force sensor 309 detecting the end of the joint, the robot arm motion and dispenser action are stopped.
8. The robot controller 205 initiates a viscous fluid breaking motion by the robotic arm 200 such as a swirl or retraction to separate dispensed fluid from the dispenser and place the tail on the seal.
9. the Sealing System repeats steps 3 through 8 for all fillet seals reachable at a worksite.
10. The operator moves platform to next fillet sealing worksite and repeats steps 3 through 9.
11. If a sealant cartridge is detected as fully dispensed, the robotic arm 200 motion and dispensing system 204 action are paused until the operator can replace cartridge 400.
12. After the completion of fillet sealing the operator shuts down system.

Figure 10:
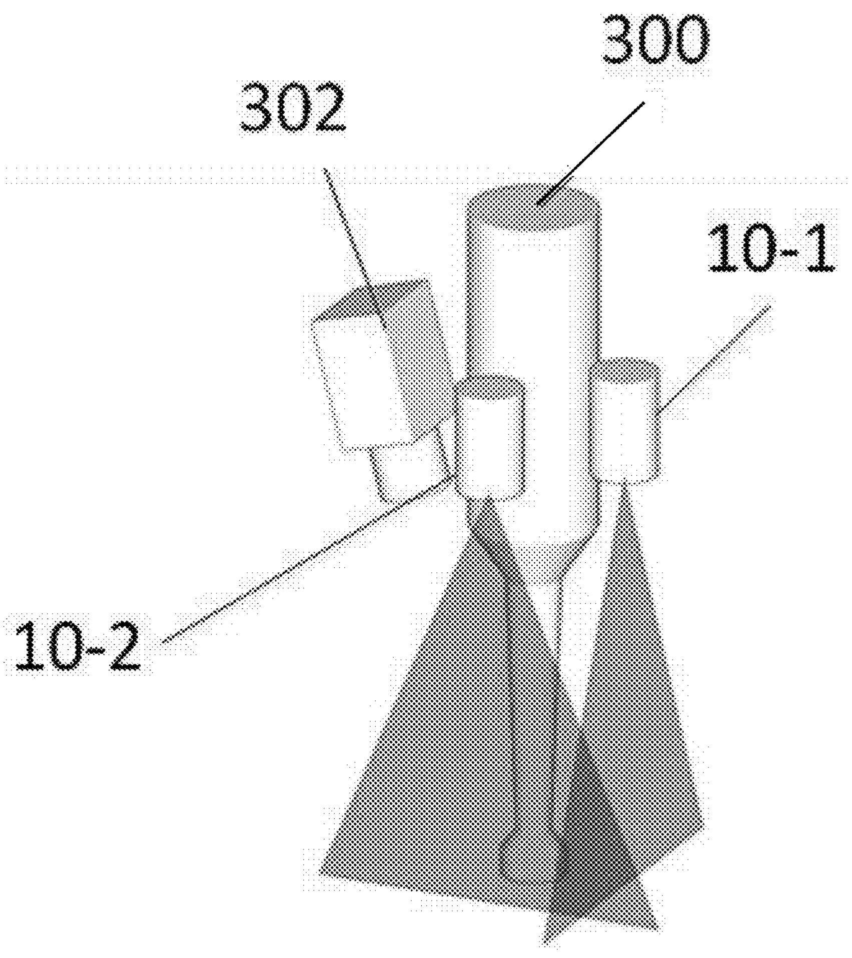
FIG. 10 shows an alternative design of the present dispensing system from FIG. 3 with a single camera and two laser projectors.

An alternative embodiment of the dispensing system is shown in FIG. 10 and includes two or more laser line projectors (10-1 and 10-2) and camera 302 (which may be either a stereo or a monocular camera) observing intersections of two laser planes with the part. The two laser line projectors 10-1 and 10-2 would be mounted so that the extracted line of best fit from each projector 10-1 and 10-2 would provide an instant surface normal via methods including and but not limited to the cross-product of the line of best fit unit vector. Ideally, the camera would be mounted in such a way so that a single camera could be used for 2D planar fastener detection and also view the two laser projections on the part. The laser projectors 10-1 and 10-2 may be turned on and off to allow acquisition of images without projected light, with laser active or both. Alternatively, one camera would be used to observe the laser lines and another to observe the tip of nozzle 307.

Figure 11:
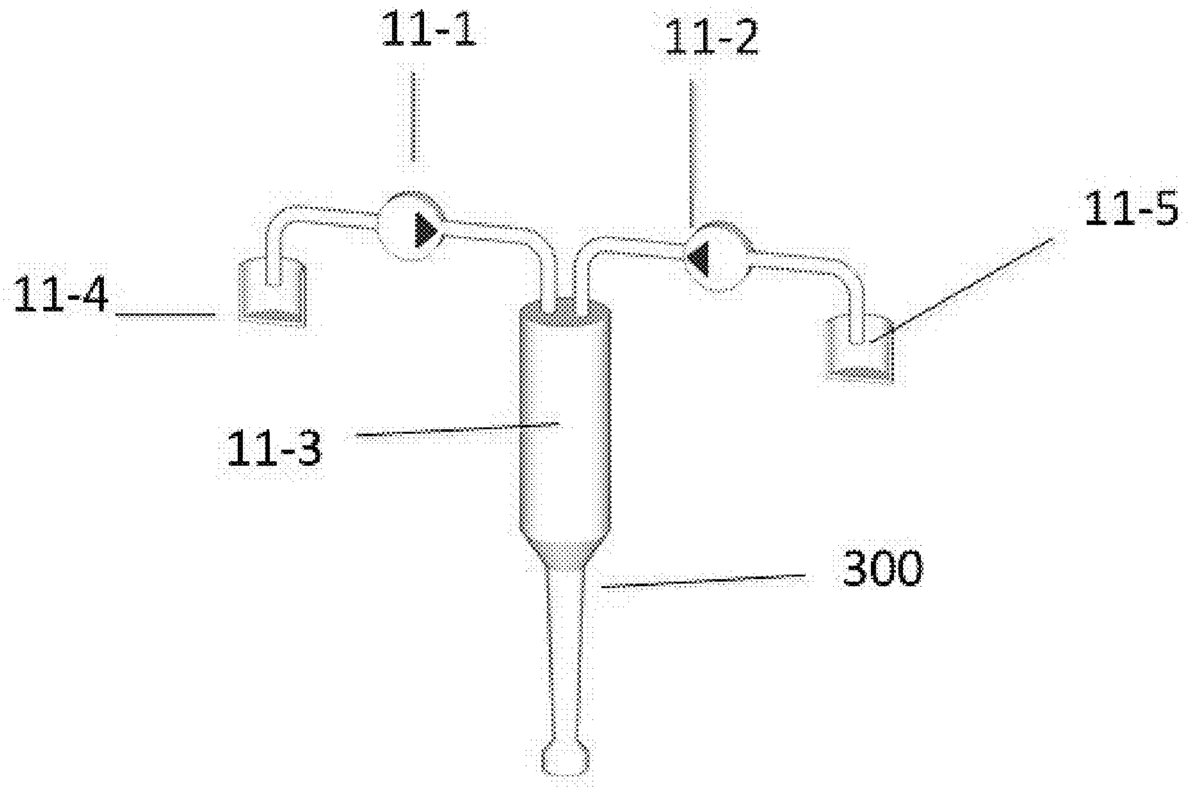
FIG. 11 shows an alternative embodiment of the present dispensing device with continuous mixing of two part compounds.

An alternative embodiment of the dispensing device 300, shown in FIG. 11, can be considered for fluids that do not come in pre-mixed cartridges. These fluids typically come in two part chemical compounds that must then be mixed together at the time of dispensing. To this end, this alternative embodiment would control the two pumps (11-1 and 11-2) (either through passive means such as valve sizing or active means such as metering) to extract the two part compounds from their respective reservoirs (11-4 and 11-5) and direct their output to a mixing nozzle (11-3). The output of the mixing nozzle can be connected to the desired shape of nozzle for shaping the fluid. The pumps can be co-located at the base of the robotic arm, mounted on the robotic arm boom (between shoulder and elbow joint or between elbow and wrist joint), or mounted on the end-effector depending on the size of pumps, volume of fluid to be dispensed, and payload capacity of the robotic arm 200.

Figure 12:
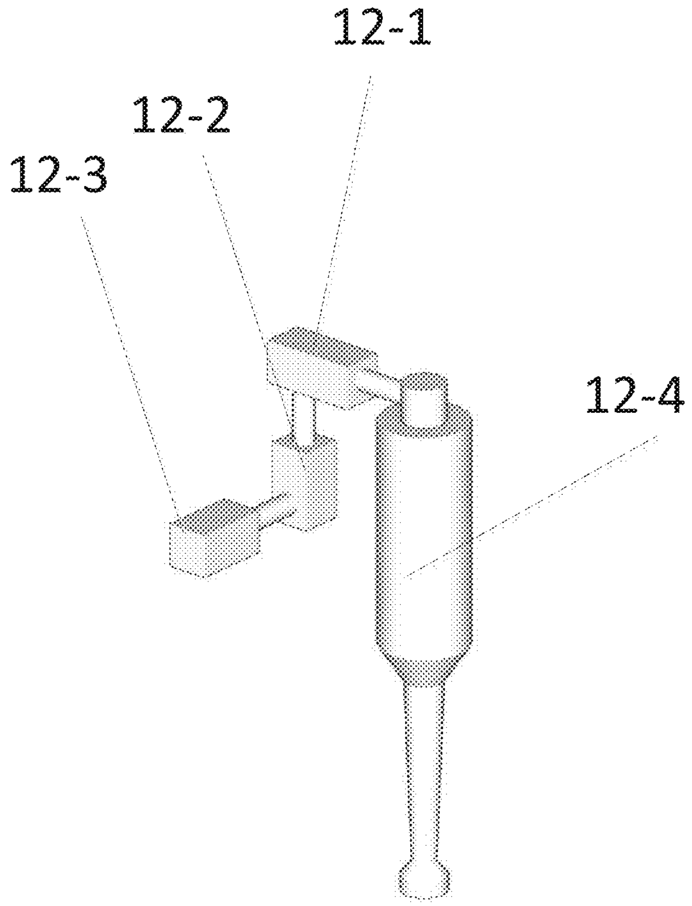
FIG. 12 shows an alternative embodiment of the dispensing system from FIG. 3 that uses three (3) linear motors

Another alternative embodiment of the dispensing system would be to attach a cam mechanism or orthogonally mounted linear motors (FIG. 12: 12-1, 12-2, 12-3) to the dispenser unit. These 3 motors can be used to provide a limited range of three orthogonal translational motions which in concert can produce a motion trajectory that forms the fluid shaping swirl pattern. Such a 3-axis motion stage can be used to make fine adjustments instead of using the whole robot arm.

Figure 13:
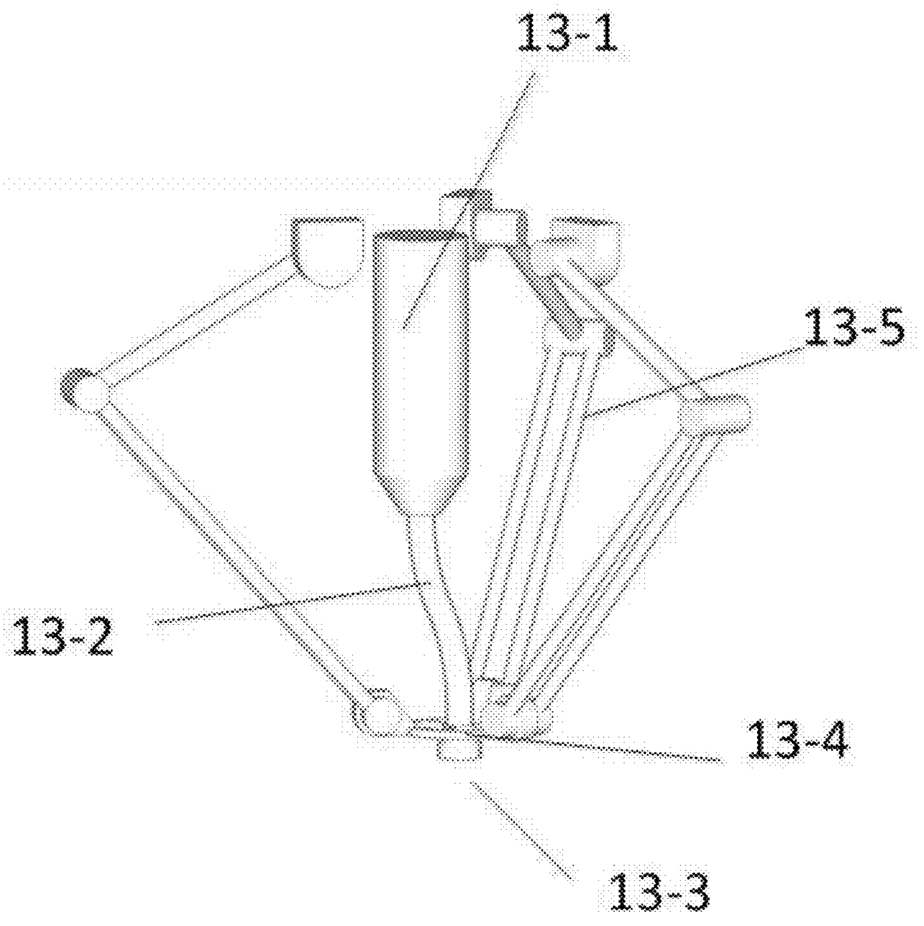
FIG. 13 shows an alternative embodiment of the dispensing system from FIG. 3 with flexible tubing.

Another alternative embodiment of the dispensing system is shown in FIG. 13 instead of a traditional rigid plastic nozzle a piece of surgical or similar tubing (13-2) is used to provide attachment from the dispenser cartridge (13-1) to the dispense nozzle/cup (13-3) that will be in contact with the fastener. This dispense nozzle/cup is clamped (13-4) to a Stewart or delta robot platform (13-5) which allows a limited range of motion for performing the fluid shaping swirl or to make fine position adjustments relative to the tip of the manipulator within the robotic sealing system.

Figure 14:
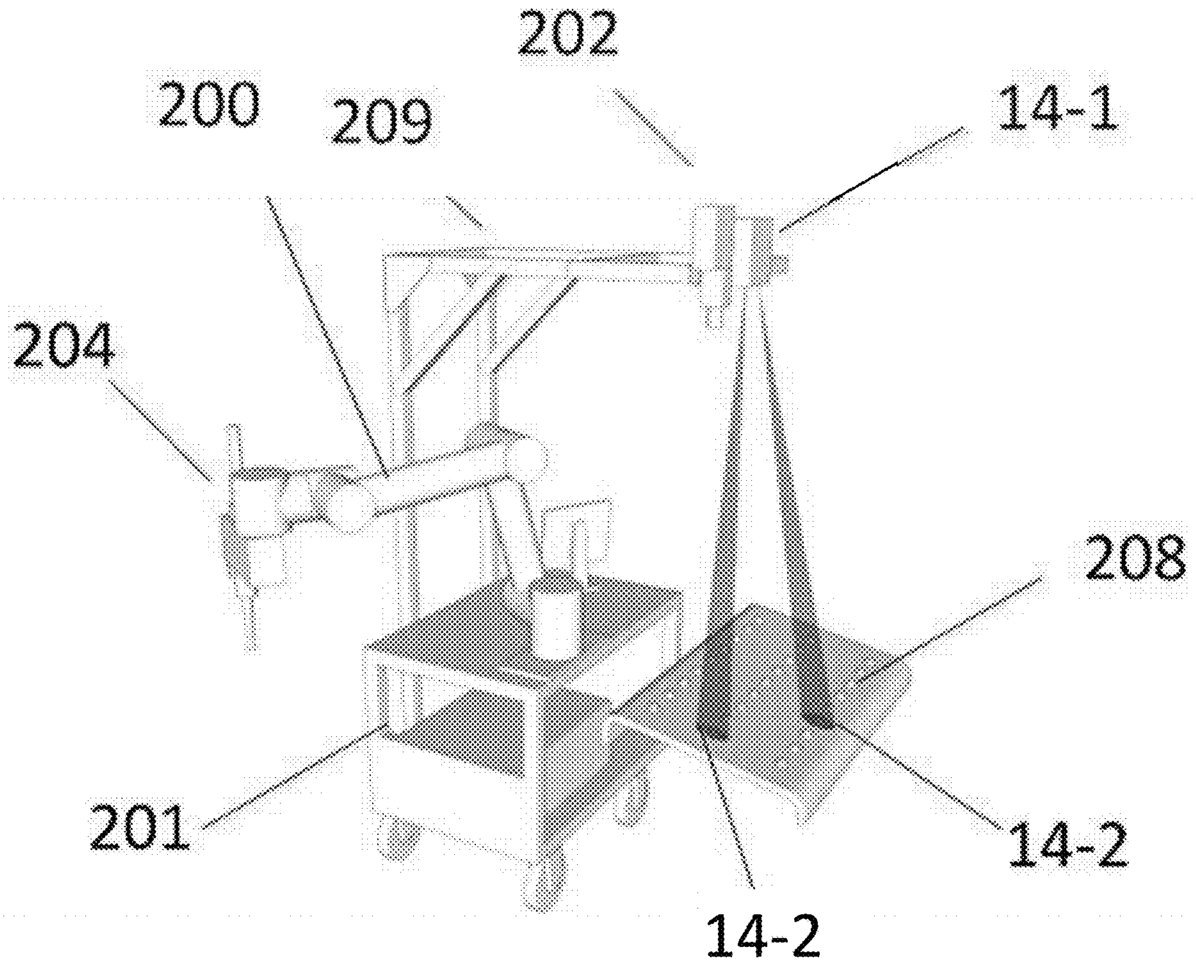
FIG. 14 shows an extension of the present embodiment of the sealing system with a pattern projector.

A potential addition to the present system is shown in FIG. 14. A projector 14-1 is mounted on the overhead frame 209 next to the overhead camera 202. The projector 14-1 can be used to highlight potential problem areas or locations to the operator (incorrect fluid dispensing, malformed fasteners, etc.) that have been detected during automated inspection of the part 208. These locations are highlighted by selectively projecting patterns of light 14-2 and 14-3 and indicating to the operator that further attention by human operators or the automated sealing system 10 is required in those areas.

Another use of the projector would include projecting an Augmented Reality style pattern (graphics and/or text) on the workpiece that the operator could use for alignment of the cart when it is moved between different worksites. When the system determines that it is time to move worksites the operator would be informed on screen and the projector 14-1 would project an outline drawing of the next work area on to the workpiece. The user could then move the platform until the outline drawing matches with features on the workpiece.

Another embodiment of the present sealing system 10 would use an external 3D vision system rather than a rangefinder 301 to find the location of the dispensing system 204 with respect to the part 208 being sealed. This vision system would localize the workpiece 208 with respect to the dispensing system 204 in lieu of the overhead camera 202. This would be achieved by using the external vision system to match features or targets attached to the workpiece and use the targets on the dispensing system 204 to locate the relative pose of the dispensing system 204 with respect to the part 208 being sealed.

Another embodiment would place the robotic arm 200 on a self-guided robotic vehicle so that the transition between worksites is automatic.

Another embodiment of the sealing system 10 would be to replace the camera 302 and rangefinder 301 scanner with a 3D camera. Equivalent 3D image processing algorithms will be used to analyze images from such a 3D camera to compute locations of fasteners.

Figure 15:
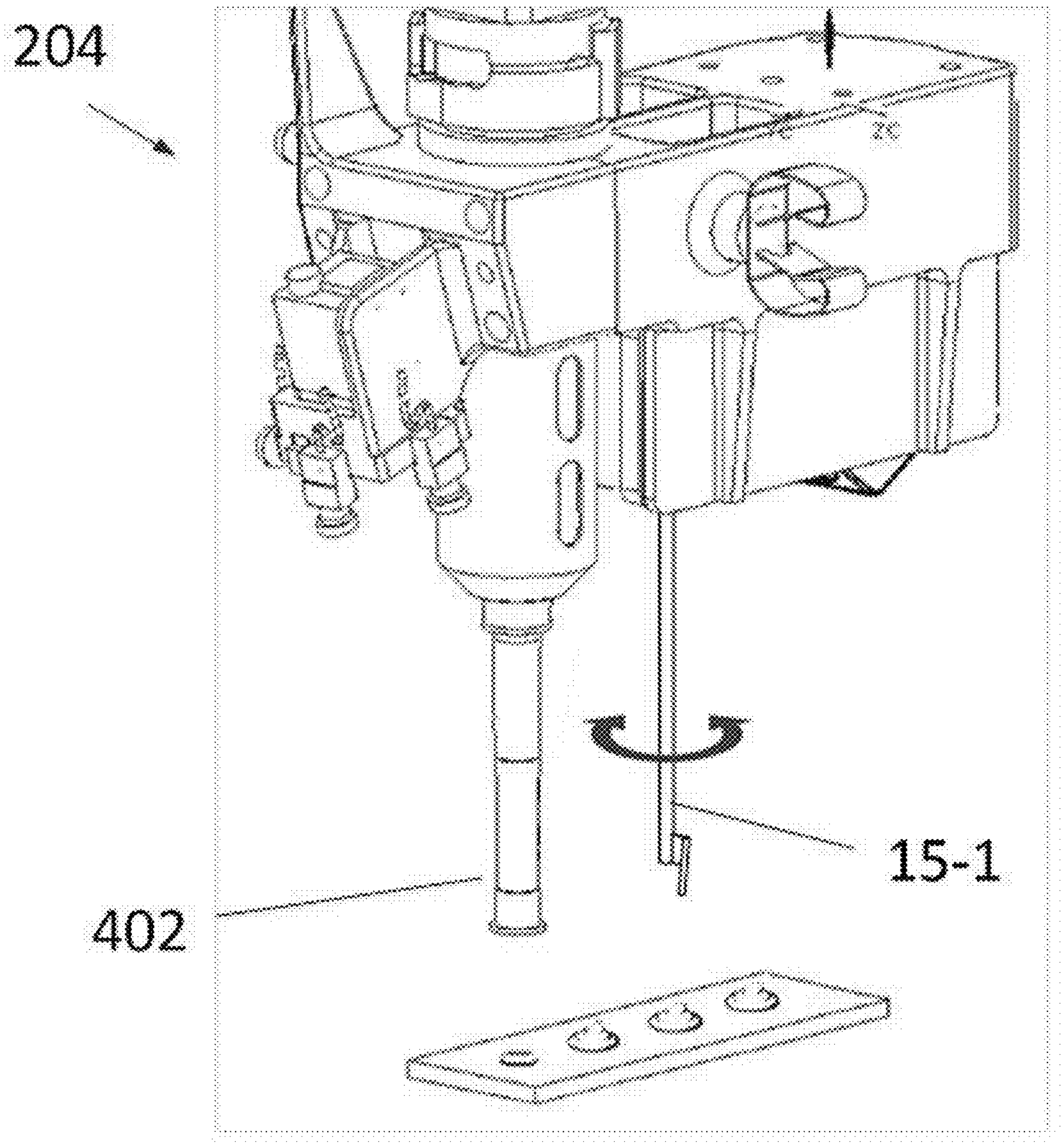
FIG. 15 shows an alternative embodiment of the dispenser shown in FIG. 3 with a rotating needle to remove any air bubbles from the sealant

An addition to the present sealing system 10 design is shown in FIG. 15. In the embodiment shown in FIG. 15 the nozzle 307 would have a separately actuated rotated needle 15-1 placed at the same height as the nozzle 307. During fillet sealing operations this rotating needle 15-1 would be activated and the robotic arm 200 would move the dispensing system 204 in such a manner so that needle 15-1 would trail the nozzle 15-1. The needle 15-1 would act to pop air bubbles in the dispensed fillet sealing fluid by agitating the surface in a manner similar to friction stir welding. Alternatively, in dome seals that are identified as having air bubbles the needle 15-1 can be moved on top of the dome seal and actuated to spin vigorously to remove any air bubbles present. In addition to the needle 15-1, a secondary silicone (or other pliable material) rounded protrusion could also follow the needle 15-1 (or be used in place of the needle) to smooth out fillets seals in a manner similar to a gloved worker dragging their finger along the finished fillet seal surface.

Figure 16:
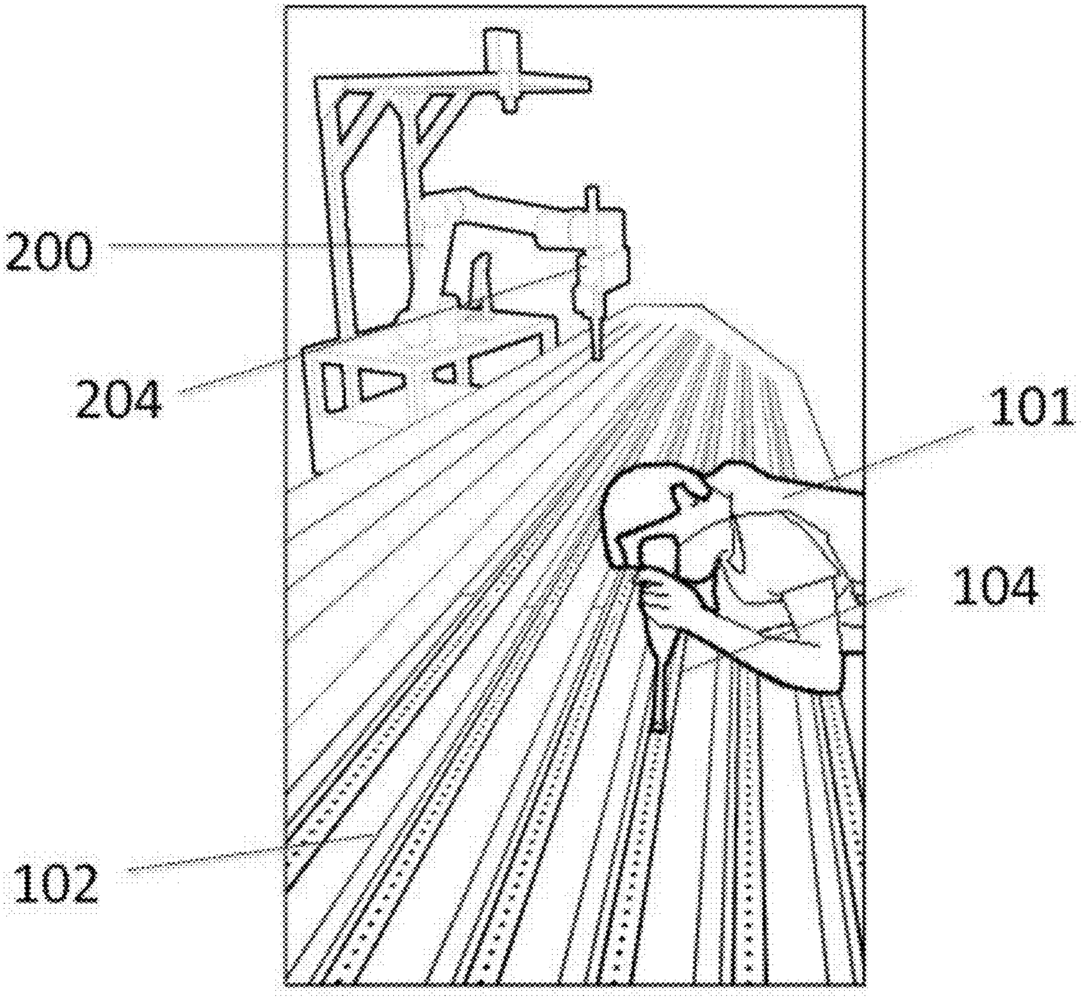
FIG. 16 shows a collaborative workcell with a robot and worker working alongside

The sealing system 10 disclosed herein may be used as a part of a collaborative robotic arm and worker workcell as shown in FIG. 16. The robotic arm 200 equipped with a dispensing system 204 is sealing the part, while the worker 101 is using a hand held dispenser 104. The worker may be correcting seals missed by the sealing system 10. The sealing system 10 is designed to safely operate in the presence of the human operator through a combination of limited robotic arm 200 maximum tip velocities, and limits on the maximum loads that the arm can exert on another object as measured by the force-moment sensor 309 and controlled by the robot controller 205.

Figure 17:
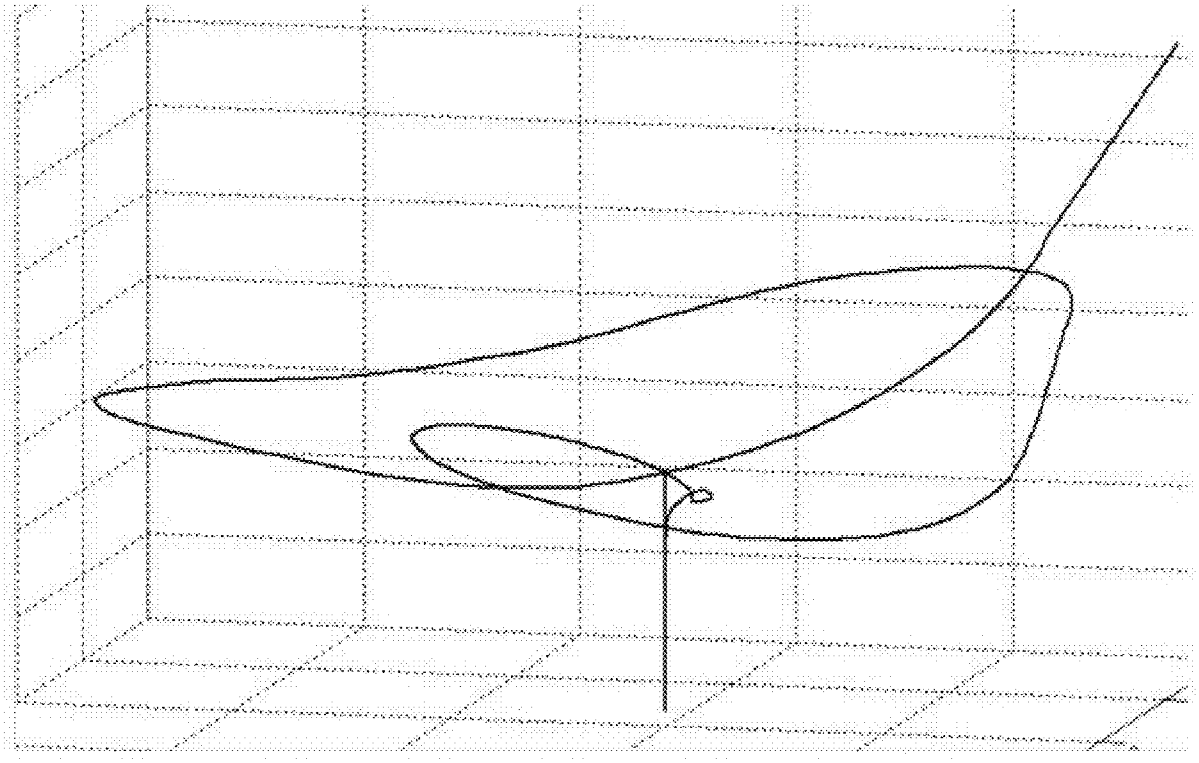
FIG. 17 shows a swirl pattern executed at the end of dome sealing.

FIG. 17 shows an example of a swirl trajectory that is executed at the end of each dome seal to deposit the viscous material on the dome and achieve the desired shape without contaminating the panel or part 208 or creating thin sealant trailing threads (tails). In an embodiment the sealing system 10 uses one or more predefined swirls depending on the shape and size of a fastener being sealed. In an alternative approach the swirl trajectory may be computed in real time using data from the vision system and observation of the sealant tail.

Alternative actions that can be performed by the system include:

1. Alternative method of achieving the correct size dome seals (comprising a replacement for steps 16 through 18 of dome sealing steps):
   a. Dispensing device 300 pre-dispenses a set amount of material into a blob underneath the nozzle 307 hovering above the fastener.
   b. The robotic arm 200 moves the dispensing system 204 down over fastener until the vision system recognizes a blob of the correct shape or the force sensor 309 determines contact has been made
   c. Dispensing device 300 retracts plunger 405.
   d. The robotic arm 200 executes swirl motion.
2. Inspection of the dispensed fluid as follows (FIG. 9):
   a. After finishing fluid dispensing on a fastener the robotic arm 200 returns to initial hover position to take a second photo of the worksite. The vision system produces information on amount of material covered and how centered fluid is on fastener via a difference between photos.
   b. After finishing a worksite the robotic arm 200 moves the dispensing system 204 slowly over recently completed areas to assess dispensed fluid quality with a laser scanner.
   c. Inspection scans can also be used to servo the dispensing system 204 to a superior location for the next fastener based on comparison with CAD data
3. Determining distance from the fastener to the dispensing system 204 by moving the dispensing device 300 towards the fastener and stopping when contact is made. Contact determination is made through measurements of the force moment sensor 309.

Therefore what is claimed is:

1. A real-time computer implemented method for automated sealing one or more features located in a part, comprising:

detecting at least one feature associated with the part to be sealed by acquiring real-time visual images of the at least one feature and a dispensing tip of a dispensing nozzle and spatially locating the at least one feature in 3 dimensions relative to the dispensing tip by determining a depth from the nozzle to the feature using a laser rangefinder and combining rangefinder data with the real-time images to give the location of the at least one feature in 3 dimensions;

computing a position and orientation of the at least one feature of the one or more features relative to the dispensing tip of the dispensing nozzle forming part of a sealant dispensing device and determining what position and orientation that said dispensing tip of said dispensing nozzle needs to be positioned in with respect to the at least one feature being sealed prior to dispensing sealant, said dispensing device being mounted to a robotic arm;

moving the robotic arm to position the dispensing device in the determined position and orientation with respect to the at least one feature; and real-time measuring and controlling of an amount of the sealant in flow between said dispensing tip and its complete deposition on the at least one feature based on real-time processing of the visual images of the sealant being dispensed which are acquired during dispensing of the sealant to produce a seal, and ceasing the flow of sealant between said dispensing tip and said feature when an amount of sealant on said feature and an amount of sealant between the feature and said dispensing tip equals a preselected amount of sealant for the seal, while depositing remaining sealant between the feature and said dispensing tip on the feature to give complete deposition.

2. The method according to claim 1 including acquiring a real-time image of the produced seal, and including assessing a quality of the produced seal by analyzing the real-time images before and after the seal is applied.

3. The method according to claim 2 wherein assessing the quality of the seal includes determining whether the seal is placed at a pre-selected location over the at least one feature.

4. The method according to claim 2 wherein assessing the quality of the produced seal includes determining whether the produced seal is of a pre-selected shape.

5. The method according to claim 4 wherein the pre-selected shape of the produced seal is a dome.

6. The method according to claim 4 wherein the pre-selected shape of the produced seal is a cone.

7. The method according to claim 2 wherein assessing the quality of the produced seal includes acquiring and analyzing a 2D image of the produced seal.

8. The method according to claim 2 wherein assessing the quality of the produced seal includes acquiring and analyzing a 3D image of the produced seal.

9. The method according to claim 1 wherein the step of computing the position and orientation further includes a calibration step.

10. The method according to claim 1, wherein said one or more features are any one or combination of fasteners and joints.

11. The method according to claim 1, wherein said one or more features are joints, and wherein the images are processed enabling real-time control of the sealant flow to achieve suitable width, shape and quality of the sealant allowing for in-situ inspection of the seal, and including, based on a width of the sealant being dispensed, sending commands to the dispensing device to increase or reduce the advancement of the plunger to increase or decrease the width of the sealant being dispensed.

12. The method according to claim 1, wherein said one or more features are fasteners, and wherein a full amount of the sealant that is completely deposited on each fastener is a dome-shaped sealant blob, and including computing an average diameter of the dome-shaped sealant blob and an average radius of the dome-shaped sealant blob dispensed on the at least one feature, based on the real-time images, and once the dome-shaped sealant blob average radius grows equal or larger to a predefined threshold the sealant dispensing device is commanded to stop dispensing sealant.

13. The method according to claim 12, wherein said vision processor is programmed for computing a maximum and minimum radius of the dome-shaped sealant blob from the fastener center, smoothness of contour and circularity of contour for tail detection for the purpose of seal inspection.

14. The method according to claim 12, wherein said vision processor is programmed for computing an offset between a center of each fastener and a center of the deposited dome-shaped sealant blob from images of said uncovered and said sealed fastener captured from the same vantage point in order to determine quality of the seal.

15. The method according to claim 1, further comprising measuring an amount of sealant dispensed between the dispensing tip and the at least one feature being sealed using a meter mechanism.

16. The method according to claim 1, wherein the step of depositing remaining sealant between the feature and said dispensing tip on the feature to give complete deposition includes commanding the robotic arm to move the nozzle in a preselected pattern to deposit the remaining sealant between the feature and the dispensing tip on the already deposited sealant in a preselected fluid shape.

* * * * *